US008538738B2

(12) United States Patent
Rajnarayan et al.

(10) Patent No.: US 8,538,738 B2
(45) Date of Patent: Sep. 17, 2013

(54) PREDICTING TRANSITION FROM LAMINAR TO TURBULENT FLOW OVER A SURFACE

(75) Inventors: Dev Rajnarayan, Mountain View, CA (US); Peter Sturdza, Redwood City, CA (US)

(73) Assignee: Aerion Corporation, Reno, NV (US)

( * ) Notice: Subject to any disclaimer, the term of this patent is extended or adjusted under 35 U.S.C. 154(b) by 358 days.

(21) Appl. No.: 13/069,374

(22) Filed: Mar. 22, 2011

(65) Prior Publication Data

US 2012/0245910 A1    Sep. 27, 2012

(51) Int. Cl.
*G06F 9/455* (2006.01)

(52) U.S. Cl.
USPC .................................. 703/9; 244/204; 244/200

(58) Field of Classification Search
USPC ...................... 703/6, 7, 9; 244/130, 200, 204; 290/55; 138/39
See application file for complete search history.

(56) References Cited

U.S. PATENT DOCUMENTS

| 5,544,524 | A | 8/1996 | Huyer et al. |
|---|---|---|---|
| 5,901,928 | A * | 5/1999 | Raskob, Jr. .................... 244/204 |
| 5,926,399 | A | 7/1999 | Berkooz et al. |
| 6,445,390 | B1 | 9/2002 | Aftosmis et al. |
| 6,516,652 | B1 | 2/2003 | May et al. |
| 7,054,768 | B2 | 5/2006 | Anderson |
| 7,243,057 | B2 | 7/2007 | Houston et al. |
| 7,251,592 | B1 | 7/2007 | Praisner et al. |
| 7,430,500 | B2 | 9/2008 | Lei et al. |
| 7,565,276 | B2 | 7/2009 | Song et al. |
| 7,813,907 | B2 | 10/2010 | Zhang et al. |
| 7,880,883 | B2 | 2/2011 | Okcay et al. |
| 7,912,681 | B2 | 3/2011 | Narramore et al. |
| 7,921,002 | B2 | 4/2011 | Kamatsuchi |
| 8,115,766 | B2 | 2/2012 | Svakhine et al. |
| 8,259,104 | B2 | 9/2012 | Pirzadeh et al. |
| 2004/0138853 | A1 | 7/2004 | Tanahashi et al. |
| 2004/0167757 | A1 | 8/2004 | Struijs |
| 2005/0098685 | A1 * | 5/2005 | Segota et al. .................. 244/130 |
| 2005/0246110 | A1 | 11/2005 | van Dam et al. |
| 2006/0025973 | A1 | 2/2006 | Kim |
| 2007/0034746 | A1 | 2/2007 | Shmilovich et al. |
| 2008/0061192 | A1 * | 3/2008 | Sullivan ........................ 244/200 |

(Continued)

OTHER PUBLICATIONS

Davis et al., "Control of aerodynamic flows", Lockheed Martin Corporation, Jun. 2005.*

(Continued)

*Primary Examiner* — Kandasamy Thangavelu
(74) *Attorney, Agent, or Firm* — Morrison & Foerster LLP

(57) ABSTRACT

A prediction of whether a point on a computer-generated surface is adjacent to laminar or turbulent flow is made using a transition prediction technique. A plurality of boundary-layer properties at the point are obtained from a steady-state solution of a fluid flow in a region adjacent to the point. A plurality of instability modes are obtained, each defined by one or more mode parameters. A vector of regressor weights is obtained for the known instability growth rates in a training dataset. For each instability mode in the plurality of instability modes, a covariance vector is determined, which is the covariance of a predicted local growth rate with the known instability growth rates. Each covariance vector is used with the vector of regressor weights to determine a predicted local growth rate at the point. Based on the predicted local growth rates, an n-factor envelope at the point is determined.

32 Claims, 14 Drawing Sheets

(56) References Cited

U.S. PATENT DOCUMENTS

| | | | |
|---|---|---|---|
| 2008/0163949 A1* | 7/2008 | Duggleby et al. ............... | 138/39 |
| 2008/0177511 A1 | 7/2008 | Kamatsuchi | |
| 2008/0300835 A1 | 12/2008 | Hixon | |
| 2009/0065631 A1* | 3/2009 | Zha ............................. | 244/12.1 |
| 2009/0142234 A1 | 6/2009 | Tatarchuk et al. | |
| 2009/0171596 A1 | 7/2009 | Houston | |
| 2009/0171633 A1 | 7/2009 | Aparicio Duran et al. | |
| 2009/0234595 A1 | 9/2009 | Okcay et al. | |
| 2009/0312990 A1 | 12/2009 | Fouce et al. | |
| 2010/0036648 A1 | 2/2010 | Mangalam et al. | |
| 2010/0250205 A1 | 9/2010 | Velazquez Lopez et al. | |
| 2010/0268517 A1 | 10/2010 | Calmels | |
| 2010/0276940 A1* | 11/2010 | Khavari et al. .................. | 290/55 |
| 2010/0280802 A1 | 11/2010 | Calmels | |
| 2010/0305925 A1 | 12/2010 | Sendhoff et al. | |
| 2011/0288834 A1 | 11/2011 | Yamazaki et al. | |
| 2012/0065950 A1 | 3/2012 | Lu | |

OTHER PUBLICATIONS

Jones et al., Direct numerical simulations of forced and unforced separation bubbles on an airfoil at incidence, Journal of fluid mechanics, 2008.*

Herbert, T., "Parabolized Stability Equations", Annual Review of Fluid Mechanics, 1997.*

Khorrami et al., "Linear and Nonlinear evolution of disturbances in supersonic streamwise vortices", High Technology Corporation, Mar. 1997.*

Tsao et al., "Application of Triple Deck theory to the prediction of glaze ice roughness formation on an airfoil leading edge", Computers & Fluids, 2002.*

Matsumura, S., "Streamwise vortex instability and hypersonic boundary layer transition on the Hyper 2000", Purdue University, Aug. 2003.*

International Search Report and Written Opinion received for PCT Patent Application No. PCT/US2012/28606, mailed on Jun. 1, 2012, 11 pages.

International Search Report and Written Opinion received for PCT Patent Application No. PCT/US2012/030427, mailed on Jun. 20, 2012, 9 pages.

International Search Report and Written Opinion received for PCT Patent Application No. PCT/US2012/030189, mailed on Jun. 20, 2012, 7 pages.

Crouch et al., "Transition Prediction for Three-Dimensional Boundary Layers in Computational Fluid Dynamics Applications", AIAA Journal, vol. 40, No. 8, Aug. 2002, pp. 1536-1541.

Dagenhart, J. Ray, "Amplified Crossflow Disturbances in the Laminar Boundary Layer on Swept Wings with Suction", NASA Technical Paper 1902, Nov. 1981, 91 pages.

Drela, Mark, "Implicit Implementation of the Full en Transition Criterion", American Institute of Aeronautics and Astronautics Paper 03-4066, Jun. 23-26, 2003, pp. 1-8.

Drela, Mark, "Two-Dimensional Transonic Aerodynamic Design and Analysis Using the Euler Equations", Ph.D. thesis, Massachusetts Institute of Technology, Dec. 1985, pp. 1-159.

Fuller et al., "Neural Network Estimation of Disturbance Growth Using a Linear Stability Numerical Model", American Institute of Aeronautics and Astronautics, Inc., Jan. 6-9, 1997, pp. 1-9.

Gaster, M., "Rapid Estimation of N-Factors for Transition Prediction", 13th Australasian Fluid Mechanics Conference, Dec. 13-18, 1998, pp. 841-844.

Gleyzes et al., "A Calculation Method of Leading-Edge Separation Bubbles", Numerical and Physical Aspects of Aerodynamic Flows II, 1984, pp. 173-192.

Krumbein, Andreas, "Automatic Transition Prediction and Application to Three-Dimensional Wing Configurations", Journal of Aircraft, vol. 44, No. 1, Jan.-Feb. 2007, pp. 119-133.

Langlois et al., "Automated Method for Transition Prediction on Wings in Transonic Flows", Journal of Aircraft, vol. 39, No. 3, May-Jun. 2002, pp. 460-468.

Perraud et al., "Automatic Transition Predictions Using Simplified Methods", AIAA Journal, vol. 47, No. 11, Nov. 2009, pp. 2676-2684.

Rasmussen et al., "Gaussian Processes for Machine Learning", MIT Press, 2006, 266 pages.

Stock et al., "A Simplified en Method for Transition Prediction in Two-Dimensional, Incompressible Boundary Layers", Journal of Flight Sciences and Space Research, vol. 13, 1989, pp. 16-30.

Sturdza, Peter, "An Aerodynamic Design Method for Supersonic Natural Laminar Flow Aircraft", Stanford University, Dec. 2003, 198 pages.

Washburn, Anthony, "Drag Reduction Status and Plans—Laminar Flow and AFC", AIAA Aero Sciences Meeting, Jan. 4-7, 2011, pp. 1-25.

Lock et al., "Viscous-Inviscid Interactions in External Aerodynamics", Progress in Aerospace Sciences, vol. 24, 1987, pp. 51-171.

Aftosmis et al., "Applications of a Cartesian Mesh Boundary-Layer Approach for Complex Configurations", 44th AIAA Aerospace Sciences Meeting, Reno NV, Jan. 9-12, 2006, pp. 1-19.

Jespersen et al., "Recent Enhancements to Overflow", AIAA 97-0644, 1997, pp. 1-17.

Drela, Mark, "XFOIL: An Analysis and Design System for Low Reynolds Number Airfoils", Proceedings of the Conference on Low Reynolds Number Aerodynamics, 1989, pp. 1-12.

Bartels et al., "CFL3D Version 6.4—General Usage and Aeroelastic Analysis", NASA/TM-2006-214301, Apr. 2006, 269 pages.

Eymard et al., "Discretization Schemes for Heterogeneous and Anisotropic Diffusion Problems on General Nonconforming Meshes", Available online as HAL report 00203269, Jan. 22, 2008, pp. 1-28.

Balay et al., "PETSc Users Manual", ANL-95/11, Revision 3.1, Mar. 2010, pp. 1-189.

Spreiter et al., "Thin Airfoil Theory Based on Approximate Solution of the Transonic Flow Equation", Report 1359-National Advisory Committee for Aeronautics, 1957, pp. 509-545.

Hess et al., "Calculation of Potential Flow About Arbitrary Bodies", Progress in Aerospace Sciences, 1967, pp. 1-138.

Lewis, R. I., "Vortex Element Methods for Fluid Dynamic Analysis of Engineering Systems", Cambridge University Press, 2005, 12 pages.

Drela et al., "Viscous-Inviscid Analysis of Transonic and Low Reynolds Number Airfoils", AIM Journal, vol. 25, No. 10, Oct. 1987, pp. 1347-1355.

Veldman, Arthur E. P., "New, Quasi-Simultaneous Method to Calculate Interacting Boundary Layers", AIAA Journal, vol. 19, No. 1, Jan. 1981, pp. 79-85.

Veldman et al., "The Inclusion of Streamline Curvature in a Quasi-Simultaneous Viscous-Inviscid Interaction Method for Transonic Airfoil Flow", Department of Mathematics, University of Groningen, Nov. 10, 1998, pp. 1-18.

Cebeci et al., "VISCID/INVISCID Separated Flows", AFWAL-TR-86-3048, Jul. 1986, 95 pages.

Carter, James E., "A New Boundary-Layer Inviscid Iteration Technique for Separated Flow", AIAA 79-1450, 1979, pp. 45-55.

Potsdam, Mark A., "An Unstructured Mesh Euler and Interactive Boundary Layer Method for Complex Configurations", AIAA-94-1844, Jun. 20-23, 1994, pp. 1-8.

Veldman, Arthur E. P., "Strong Viscous-Inviscid Interaction and the Effects of Streamline Curvature", CWI Quarterly, vol. 10 (3&4), 1997, pp. 353-359.

Veldman, Arthur E. P., "A Simple Interaction Law for Viscous-Inviscid Interaction", Journal of Engineering Mathematics, vol. 65, 2009, pp. 367-383.

Coenen et al., "Quasi-Simultaneous Viscous-Inviscid Interaction for Three-Dimensional Turbulent Wing Flow", ICAS 2000 Congress, 2000, pp. 731.1-731.10.

Veldman, Arthur E. P., "Quasi-Simultaneous Viscous-Inviscid Interaction for Transonic Airfoil Flow", American Institute of Aeronautics and Astronautics Paper 2005-4801, 2005, pp. 1-13.

Non Final Office Action received for U.S. Appl. No. 12/982,744, mailed on Oct. 2, 2012, 21 pages.

Notice of Allowance received for U.S. Appl. No. 13/046,469, mailed on Jan. 10, 2013, 19 pages.

Notice of Allowance received for U.S. Appl. No. 12/982,744, mailed on Feb. 5, 2013, 8 pages.

Allison et al., "Static Aeroelastic Predictions for a Transonic Transport Model using an Unstructured-Grid Flow Solver Coupled with a Structural Plate Technique", NASA/TP-2003-212156, Mar. 2003, 49 pages.

"Chapter 3: Numerical Simulation of Flows past Bluff Bodies", 2001, pp. 6-19.

Frink et al., "An Unstructured-Grid Software System for Solving Complex Aerodynamic Problems", NASA, 1995, pp. 289-308.

Kravtsova et al., "An Effective Numerical Method for Solving Viscous-Inviscid Interaction Problems", Philosophical Transactions of the Royal Society A, vol. 363, May 15, 2005, pp. 1157-1167.

Lagree, P. Y., "Interactive Boundary Layer [IBL] or Inviscid-Viscous Interactions [IVI or VII]", Dec. 14, 2009, pp. 1-29.

Mavriplis, Dimitri J., "Aerodynamic Drag Prediction using Unstructured Mesh Solvers", National Institute of Aerospace 144 Research Drive, Hampton, VA 23666, U.S., 2003, pp. 1-83.

May et al., "Unstructured Algorithms for Inviscid and Viscous Flows Embedded in a Unified Solver Architecture: Flo3xx", 43rd Aerospace Sciences Meeting and Exhibit, American Institute of Aeronautics and Astronautics Paper 2005-0318, Reno, NV, Jan. 10-13, 2005, pp. 1-15.

Neel, Reece E., "Advances in Computational Fluid Dynamics: Turbulent Separated Flows and Transonic Potential Flows", Aug. 1997, 272 pages.

Smith et al., "Interpolation and Gridding of Aliased Geophysical Data using Constrained Anisotropic Diffusion to Enhance Trends", SEG International Exposition and 74th Annual Meeting, Denver, Colorado, Oct. 10-15, 2004, 4 pages.

Veldmann et al., "Interaction Laws in Viscous-Inviscid Coupling", 2004, pp. 225-232.

Weickert et al., "Tensor Field Interpolation with PDEs". Universität des Saarlandes, 2005, 17 pages.

International Search Report and Written Opinion received for PCT Patent Application No. PCT/US2011/67917, mailed on May 1, 2012, 10 pages.

* cited by examiner

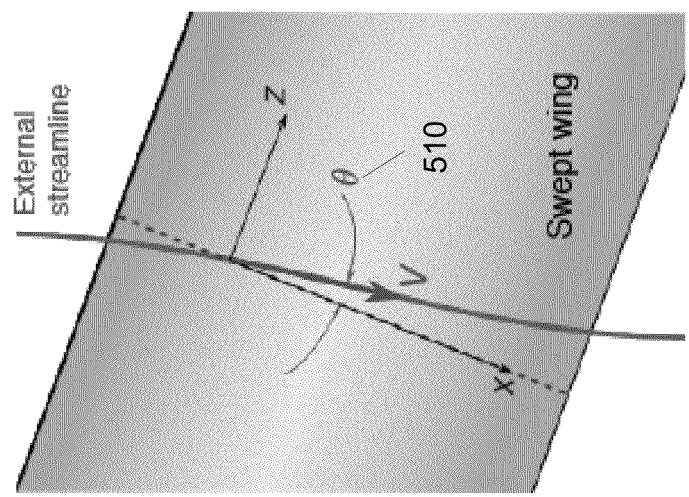
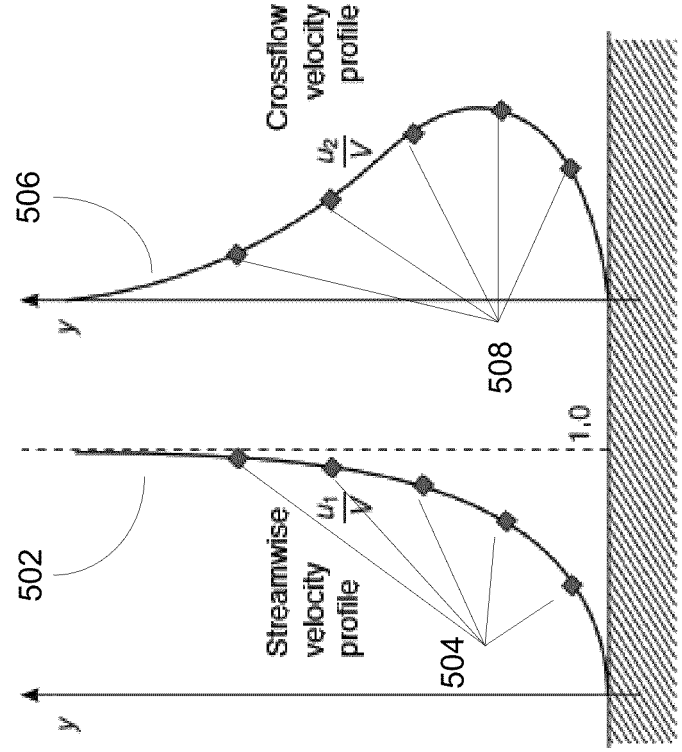
Fig. 5

PREDICTING TRANSITION FROM LAMINAR TO TURBULENT FLOW OVER A SURFACE

STATEMENT REGARDING FEDERALLY SPONSORED RESEARCH OR DEVELOPMENT

This invention was made with Government support under contract NNL08AA08C awarded by NASA. The Government has certain rights in the invention.

BACKGROUND

1. Field

This application relates generally to simulating a fluid flow over a computer-generated surface and, more specifically, to predicting whether a point on the surface is adjacent to laminar or turbulent flow.

2. Description of the Related Art

Aerodynamic analysis of an aircraft moving through a fluid typically requires an accurate prediction of the properties of the fluid surrounding the aircraft. Accurate aerodynamic analysis is particularly important when designing aircraft surfaces, such as the surface of a wing or control surface. Typically, the outer surface of a portion of the aircraft, such as the surface of a wing, is modeled, either physically or by computer model, so that a simulation of the fluid flow can be performed and properties of the simulated fluid flow can be measured. Fluid-flow properties are used to predict the characteristics of the wing, including lift, drag, boundary-layer velocity profiles, and pressure distribution. The flow properties may also be used to map laminar and turbulent flow regions near the surface of the wing and to predict the formation of shock waves in transonic and supersonic flow.

A computer-generated simulation can be performed on a computer-generated aircraft surface to simulate the fluid dynamics of a surrounding fluid flow. The geometry of the computer-generated aircraft surface is relatively easy to change and allows for optimization through design iteration or analysis of multiple design alternatives. A computer-generated simulation can also be used to study situations that may be difficult to reproduce using a physical model, such as supersonic flight conditions. A computer-generated simulation also allows a designer to measure or predict fluid-flow properties at virtually any point in the model by direct query, without the difficulties associated with physical instrumentation or data acquisition techniques. In this way, computer-generated simulations allow a designer to select an aircraft surface design that optimizes particular fluid-flow characteristics.

In some cases, a portion of an aircraft surface, such as a wing surface, can be optimized to maximize regions of laminar flow. A region of fluid flow may be considered laminar when the flow tends to exhibit a layered or sheet-like flow. In laminar-flow regions there is little mixing between the layers or sheets of fluid flow having different fluid velocities. Laminar flow can be contrasted to turbulent flow, which tends to exhibit chaotic or erratic flow characteristics. In turbulent-flow regions there is a significant amount of mixing between portions of the fluid flow having different fluid velocities.

Near the surface of a wing, the fluid flow typically begins as laminar flow at the leading edge of the wing and becomes turbulent as the flow progresses to the trailing edge of the wing. The location on the surface of the wing where the fluid flow transitions from laminar to turbulent is called a transition point. The further the transition point is from the leading edge, the larger the region of laminar flow.

There are many advantages to aircraft utilizing laminar flow over large portions of the fuselage and wing surfaces. In general, laminar flow dissipates less energy than turbulent flow. Increasing the proportion of laminar flow regions over a wing surface reduces drag, and therefore, reduces fuel burn, emissions, and operating costs.

According to one model, the transition to turbulent flow is caused by the growth of instabilities in the boundary-layer fluid flow adjacent to the aircraft surface. These instabilities may be initiated by, for example, surface contamination, roughness, vibrations, acoustic disturbances, shockwaves, or turbulence in the free-stream flow. The instabilities start out as small, periodic perturbations to the fluid flow near the aircraft surface, then grow or decay depending on the properties of the boundary layer, such as flow velocity and temperature profiles. At first, when the instabilities are small, their behavior is similar to sinusoidal plane wave instabilities and can be described by linearized perturbation equations. As the unstable modes grow in amplitude, nonlinear interactions become dominant. Following the nonlinear growth, the laminar instabilities begin causing intermittent spots of turbulence, which spread and eventually merge together, resulting in a fully turbulent boundary layer.

When predicting the location where a laminar flow transitions to turbulent flow, designers may consider many different types of instabilities. These types include Tollmien-Schlichting (TS) wave instabilities and crossflow vortices. The type of instability may depend, in part, on the geometry of the aircraft, such as the degree of sweep of the wing.

For a given instability type (e.g., TS wave or crossflow vortex), there are typically multiple individual instability modes that may be defined using mode parameters, such as temporal frequency and/or spatial spanwise wave number. By considering a range of individual instability modes when simulating a fluid flow around the aircraft surface, designers may account for a variety of potential instability sources.

In general, transition prediction techniques allow a designer to estimate the point on an aircraft surface where laminar flow first transitions to turbulent flow. In some cases, designers may attempt to maximize regions of laminar flow by designing the surface of the wing so that the transition point is as far from the leading edge as possible. Producing useful results often requires running complex simulations over a wide range of design variables and flight conditions. Unless the transition prediction technique is efficient and easy to use, running multiple complex simulations may be prohibitively time-consuming in the earlier stages of aircraft design where major configuration changes are likely.

One transition prediction technique is based on linear stability theory (LST), which may be used to model the growth of instabilities in a boundary-layer fluid flow around a computer-generated aircraft surface. LST models these instabilities as spatio-temporal waves that are amplified or attenuated as the flow progresses along the boundary layer. This modeling requires the solution of an eigenvalue problem. Input to an LST-based analysis includes a boundary-layer solution and values parameterizing a selected instability mode (e.g., wave number and frequency). The input boundary-layer solution includes, for example, boundary-layer properties such as flow velocity and temperature and can be determined using a time-invariant computational fluid dynamics (CFD) simulation module. As an output, LST-based analysis computes an instability local growth rate associated with the selected instability mode at a given point on the aircraft surface.

While LST-based analysis may produce accurate results, LST-based analysis may be prohibitively time-consuming in early design phases. LST-based analysis may require the user to interact with the analysis frequently to check for lost modes and nonphysical results. This interaction is not only time-consuming, but also requires that the user have experience interacting with the specific implementation of the LST-based analysis. Thus, even with powerful computing resources, LST-based analysis may be impractical when iterating through a large number of design configurations in the early phases of aircraft design.

In contrast to those based on LST-based analysis, there are other transition prediction techniques that require very little user interaction but may sacrifice accuracy or reliability. Without high accuracy and reliability, these techniques are less useful for iterating design configuration in the early phases of aircraft design.

The techniques described herein can be used to generate a growth-rate model that reduces or eliminates the need for user interaction. Further, iteration of the techniques described herein can be used to provide a prediction of the transition point on a computer-generated aircraft surface.

SUMMARY

One exemplary embodiment includes a computer-implemented method of predicting whether a point on a computer-generated surface is adjacent to laminar or turbulent fluid flow. A plurality of boundary-layer properties at the point are obtained from a steady-state solution of a fluid flow in a region adjacent to the point. A plurality of instability modes are obtained. Each instability mode is defined by one or more mode parameters. A vector of regressor weights for the known instability growth rates in a training dataset is obtained. The vector of regressor weights is based on the covariance of the known instability growth rates in the training dataset. For each instability mode in the plurality of instability modes, a covariance vector is determined. The covariance vector comprises the covariance of a predicted local growth rate for the instability mode at the point with the known instability growth rates in the training dataset. Each covariance vector is used with the vector of regressor weights to determine a predicted local growth rate for the instability mode at the point with the boundary-layer properties. Based on the predicted local growth rates, an n-factor envelope at the point is determined. The n-factor envelope at the point is indicative of whether the point is adjacent to laminar or turbulent flow.

DESCRIPTION OF THE FIGURES

FIG. 5 depicts the crossflow and streamwise velocity profiles and the angle between the reference axis and the external streamline.

The figures depict one embodiment of the present invention for purposes of illustration only. One skilled in the art will readily recognize from the following discussion that alternative embodiments of the structures and methods illustrated herein can be employed without departing from the principles of the invention described herein.

DETAILED DESCRIPTION

Figure 1:
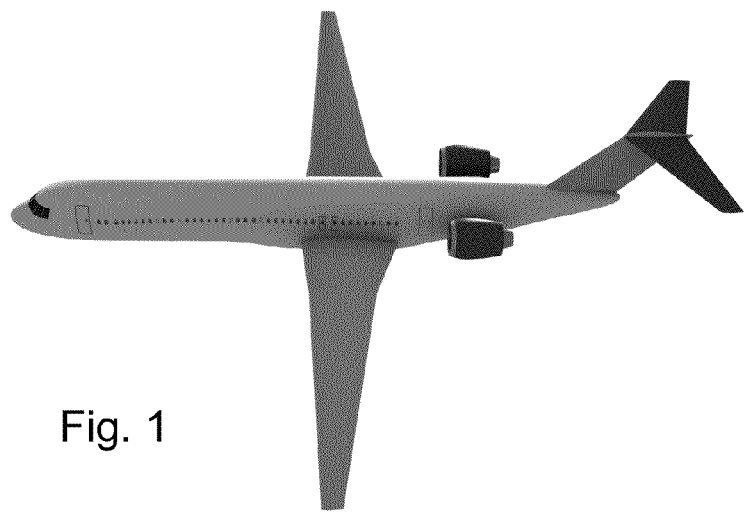
FIG. 1 depicts a supersonic natural-laminar-flow concept jet.
Figure 2:
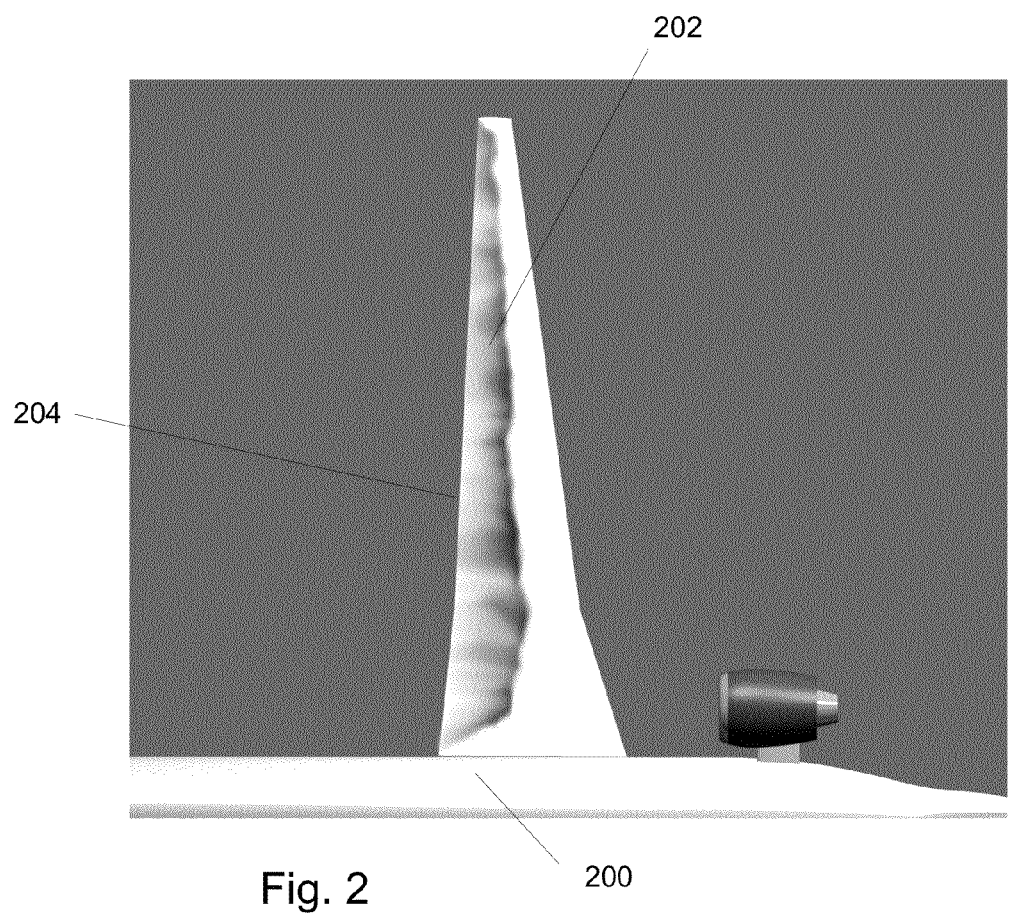
FIG. 2 depicts a computer-generated simulation of fluid flow over the surface of a natural-laminar-flow concept jet.

FIG. 1 illustrates a transonic natural-laminar-flow (NLF) concept jet. FIG. 2 shows a top view of a portion of a computer-generated simulation of the NLF jet. The shading on the wing 202 is proportional to the combined TS and crossflow instabilities on the upper surface at Mach 0.75 at 33,000 feet. The white areas on the wing 202 indicate regions where turbulent flow is predicted. As seen in FIG. 2, locations near fuselage 200 exhibit turbulent flow closer to the leading edge 204 of the wing 202 as compared to locations further away from fuselage 200.

The results depicted in FIG. 2 are an example of the output of a computer-generated simulation that allows a designer or engineer to evaluate the performance of an aircraft surface with respect to laminar flow. If necessary, changes can be made to the aircraft surface geometry to optimize or increase the amount of laminar flow. Additional simulations can be performed for modified aircraft surface geometry and the results can be compared. To allow for multiple design iterations, it is advantageous to perform multiple simulations in a short amount of time. The following process can be used to provide an accurate prediction of the transition point in a way that reduces simulation time and human interaction.

The processes described herein provide for prediction of the transition from laminar to turbulent flow with reduced amounts of user interaction. The following discussion provides an example of a simulated fluid flow over an aircraft surface. However, the processes may also be applied to a simulated fluid flow over any type of surface subjected to a fluid flow. For example, the following processes could be applied to the surface of a space vehicle, land vehicle, watercraft, or other object having a surface exposed to a fluid flow. In addition, the following processes can be applied to simulations of various types of fluid flow, including, for example, a gas fluid flow or liquid fluid flow.

Figure 3A:
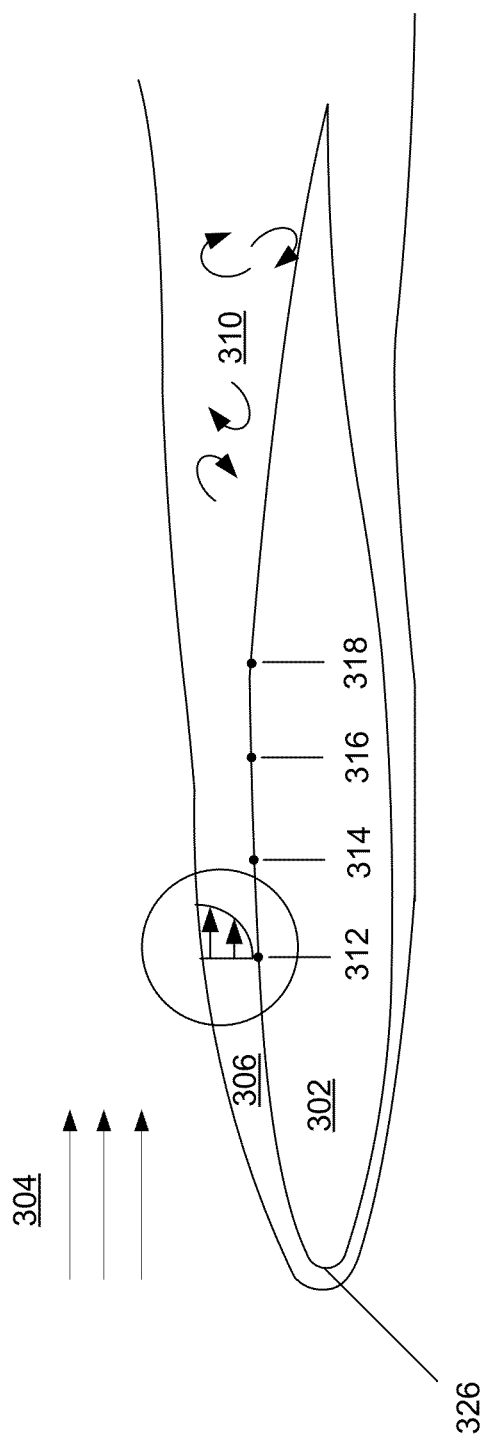
FIGS. 3a and 3b depict an exemplary fluid flow over a wing.
Figure 3B:
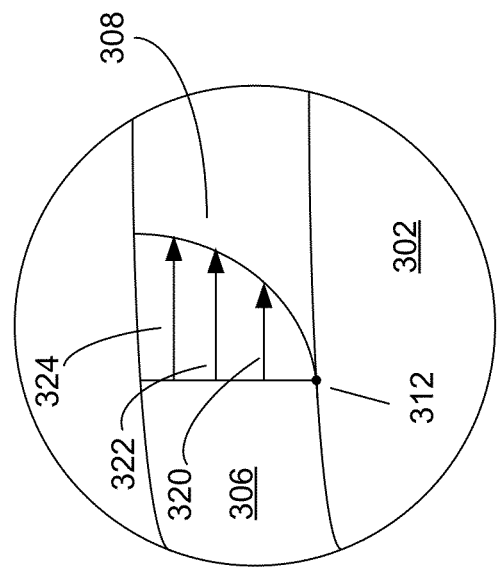

FIGS. 3a and 3b depict an exemplary aircraft surface, a wing section 302, and a two-dimensional representation of a fluid flow. The fluid flow is classified by two regions: outer region 304 and boundary-layer region 306, 310. As shown in FIGS. 3a and 3b, the laminar flow portion 306 of the boundary-layer region begins near the leading edge 326 of the wing surface 302 and is characterized by a sharply increasing velocity profile 308. Skin friction causes the fluid velocity close to the wing surface 302 to be essentially zero, with respect to the surface. The sharply increasing velocity profile 308 develops as the velocity increases from a near-zero velocity to the boundary-layer edge velocity.

The fluid flow within the boundary layer having a velocity profile 308 may be considered laminar because of the layered or sheet-like nature of the fluid flow. However, the growth of instabilities within the boundary layer may result in turbulent flow 310 further downstream from the leading edge. Transition prediction estimates the location on the surface of the wing where the fluid flow in the boundary layer changes from laminar to turbulent.

1. Exemplary Process for Transition Prediction

Figure 4:
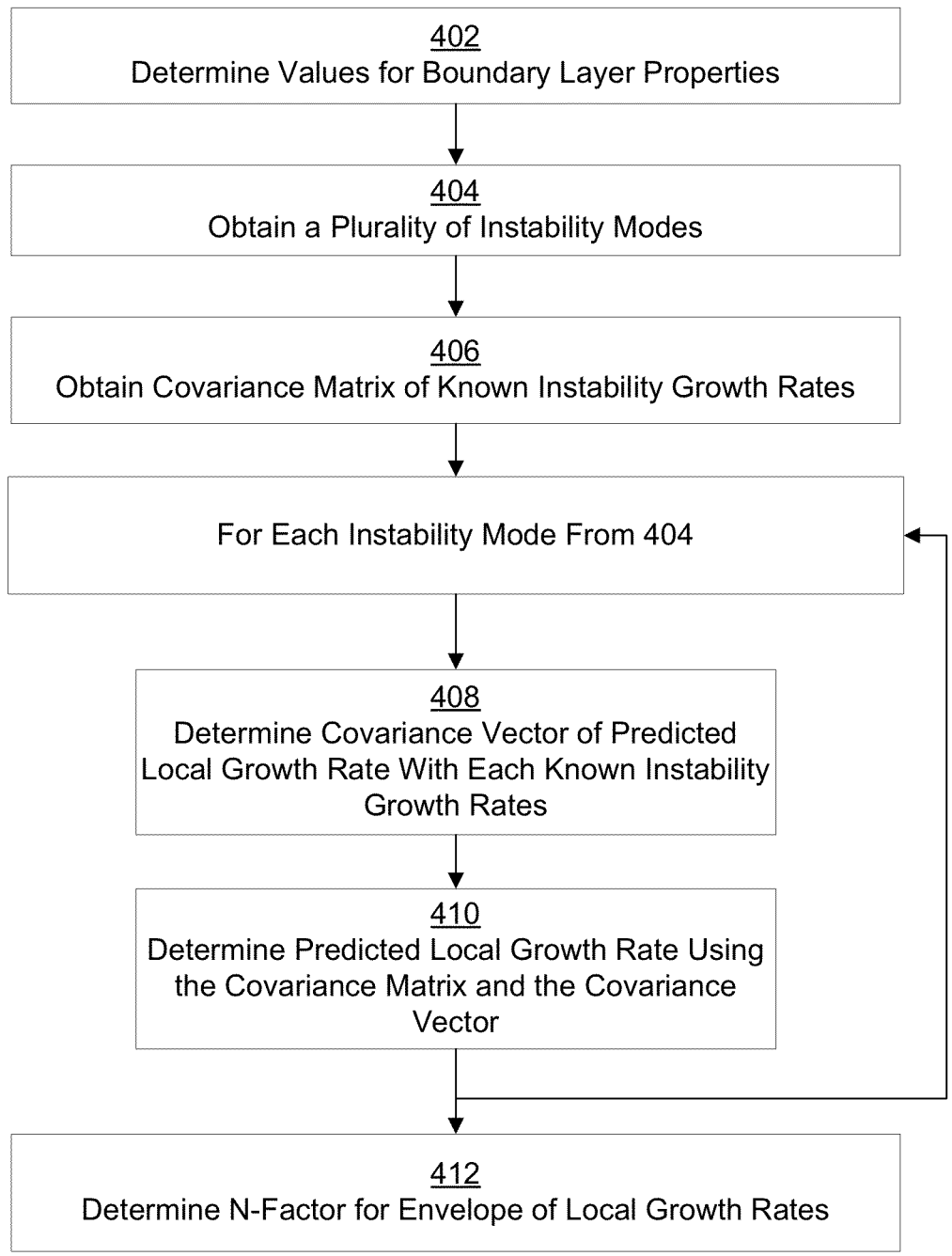
FIG. 4 depicts an exemplary process for predicting a point on an n-factor envelope.

FIG. 4 depicts a flow chart for an exemplary process 400 for predicting whether fluid flow near a point of interest (POI) on a computer-generated aircraft surface is laminar or turbulent. Exemplary process 400 is suitable for integration into a computer-generated simulation. Operations described in the flow chart may be repeated on a point-by-point basis across the computer-generated aircraft surface to produce an envelope curve. The fluid flow is predicted to transition to turbulent flow at the location where the envelope, discussed in operation 412 below, exceeds a threshold or critical value. For example, referring to FIG. 3a, the process may be performed for each surface point 312, 314, 316, and 318 to construct an envelope curve used to determine the transition point on the wing surface 302.

The computer-generated aircraft surface may include, for example, a portion of an airfoil surface or a part of a fuselage surface obtained from a computer-aided design (CAD) computer software package. In some cases, the computer-generated aircraft surface includes a surface mesh of polygons, such as a mesh of triangles that represents the surface of the aircraft. A fluid-flow mesh may also be defined representing a fluid-flow region adjacent to the computer-generated aircraft surface. In some cases, the fluid-flow mesh is generated using, for example, a mesh generation program or a computation-fluid dynamics (CFD) simulation module that contains automated mesh generation functionality.

The POI on the computer-generated aircraft surface where a point on the envelope curve is to be determined may be selected using the surface mesh of polygons. For example, the POI may be a vertex of one of the polygons or a geometrical feature such as a centroid of one of the polygons. Alternatively, the POI may be an arbitrary point on the computer-generated aircraft surface that is not associated with any particular feature of the surface mesh.

With reference again to FIG. 4, in operation 402 of the process 400, values are determined for boundary-layer properties of the fluid flow near the POI. Exemplary boundary-layer fluid properties may include flow velocity, fluid pressure, and temperature. The values of these properties vary as the POI is chosen to be at different locations on the computer-generated aircraft surface.

In some cases, a CFD simulation module can use the surrounding fluid flow mesh to determine the values of the boundary-layer fluid properties. In some cases, the results of the CFD simulation module represent a steady-state solution of the surrounding fluid flow. Values for the boundary-layer properties relevant to the POI on the computer-generated aircraft surface are extracted from the steady-state solution. The boundary-layer properties are selected depending on their influence in determining whether fluid flow is laminar or turbulent near the POI.

In some cases, one or more fluid cells of the fluid-flow mesh are identified as representing a portion of the boundary-layer fluid flow near the POI on the computer-generated aircraft surface. Values of selected boundary-layer properties are extracted from the identified fluid cells. Exemplary boundary-layer properties that may be relevant to predicting transition include local Reynolds number, velocity ratios, and wall-to-external temperature ratios. The relevant boundary-layer properties may depend, in part, on the type of instability being analyzed.

The particular boundary-layer properties that are determined in operation 402 may depend on the type of instabilities (e.g., TS wave or crossflow vortex) under consideration. Depending on the type of instability, different sets of boundary-layer properties may be relevant to transition prediction. Therefore, each type of instability being analyzed may require different sets of boundary-layer properties and mode parameters.

For example, for TS-wave instabilities with reference to FIG. 5, relevant boundary-layer properties may include: a Reynolds number defined by $$R = u_e l / v_e,$$

where $$l = \sqrt{v_e x / u_e};$$

the local Mach number at the boundary-layer edge; five points 504 along the streamwise velocity profile 502; five points 508 along the crossflow velocity profile 506; five points along the temperature profile; and the angle between the reference axis and the external streamline 510.

Figure 6:
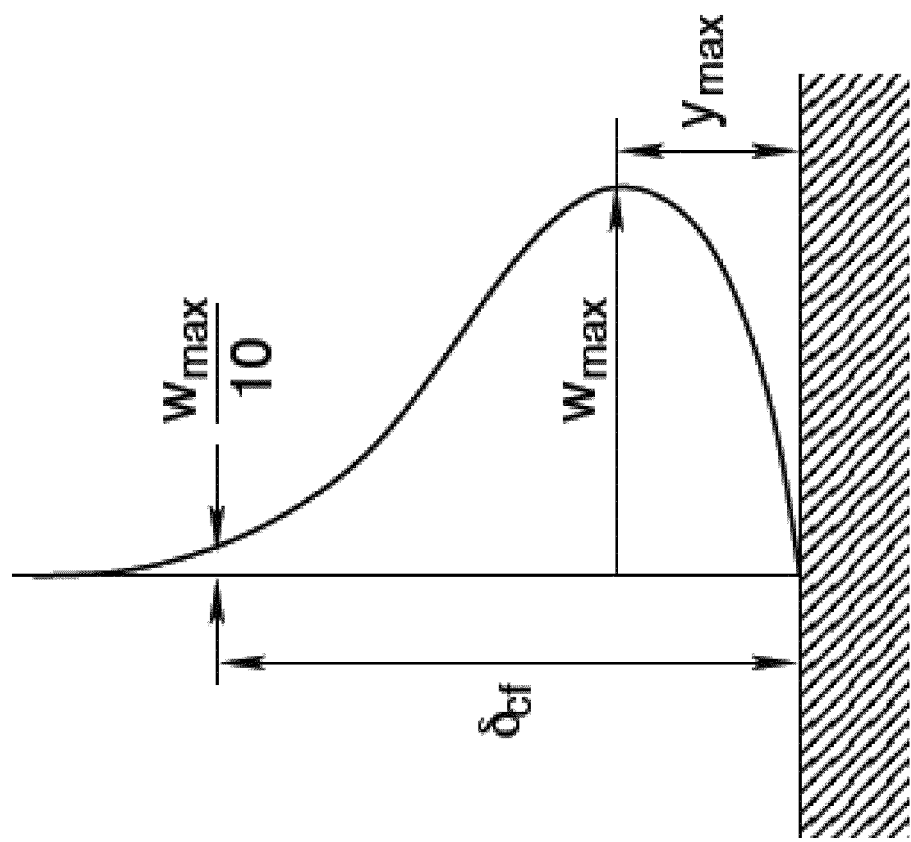
FIG. 6 depicts a crossflow velocity profile.

In another example, for stationary crossflow instabilities with reference to FIG. 6, relevant boundary-layer properties may include:

crossflow Reynolds number:

$$\frac{\rho u_e \delta_{cf}}{\mu};$$

crossflow velocity ratio:

$$\frac{|w_{max}|}{u_e};$$

crossflow shape factor:

$$\frac{|y_{max}|}{\delta_{cf}};$$

and the ratio of the wall temperature to external temperature.

In the examples given above, only four boundary-layer properties are used when considering stationary crossflow vortices, while twenty boundary-layer properties are used when considering TS-wave instabilities.

In yet another example, the same boundary-layer properties may be used for both crossflow vortices and TS-wave instabilities. In this example, the twenty boundary-layer properties discussed above with respect to TS-wave instabilities may also be used for crossflow vortices.

While specific examples of boundary-layer properties for particular types of instabilities are given above, these examples should not be read to limit the boundary-layer properties that are used. The boundary-layer properties may be chosen to give the best results.

With reference again to FIG. 4, in operation 404, a matrix of parameters defining a plurality of instability modes is constructed. In an example of operation 404, each mode in the matrix of modes is defined using at least one of two mode parameters: a temporal frequency and a spatial spanwise wave number.

The mode parameters used to define the set of instability modes in the matrix may depend, in part, on the type of instability being analyzed. For example, for stationary crossflow vortices, the instability modes may have a temporal frequency of zero. Thus, the matrix for crossflow vortices is defined using a range of wave numbers and a single (zero) temporal frequency. In another example, for TS-wave instabilities, the instability modes may be defined using both a temporal frequency and a spatial spanwise wave number. Values for wave numbers and frequency parameters may be selected at equal intervals across a range of interest.

In operation 406, a vector of regressor weights of the known instability growth rates in a training dataset is obtained. In some cases where the vector of regressor weights has previously been constructed, operation 406 may be accomplished by loading the vector of regressor weights from memory.

If the vector of regressor weights has not been previously constructed, access to a training dataset is required. The training dataset includes a plurality of known instability growth rates, each known instability growth rate having a corresponding input vector. The known instability growth rates are based on the input vector and determined using a source that is considered to be accurate. In some cases, LST-based analysis may be used to determine the known instability growth rates. LST-based analysis is discussed below with respect to FIG. 15.

The training input vector includes boundary-layer properties and at least one mode parameter. The training input vector represents the input used to calculate the known instability growth rate. Typically, multiple training input vectors are defined to represent multiple training instability modes, each training instability mode using the same boundary-layer property values. Creation of the training dataset is further discussed below with respect to FIG. 8.

The vector of regressor weights $\beta$ may be determined based on a covariance matrix $\Sigma_1$ of the known instability growth rates in the training dataset and a vector of the known instability growth rates $\alpha_k$ in the training dataset according to:

$$\beta = \Sigma_i^{-1} \alpha_k \qquad \text{Equation 1}$$

Each element of the covariance matrix $\Sigma_1$ specifies the covariance of one known instability growth rate in the training dataset with another known instability growth rate in the training dataset. The covariance matrix $\Sigma_1$ is the correlation matrix multiplied by the variance $\sigma_0^2$, which may be determined using the expected range of variation in growth rates and an optimization technique (e.g., marginal likelihood) with training data. If the training dataset includes m known instability growth rates, then the size of the correlation matrix and the covariance matrix will be m×m. An element $\Sigma_{ij}$ of the covariance matrix $\Sigma_1$ is the correlation of the $i^{th}$ known instability growth rate $\alpha_i$ to the $j^{th}$ known instability growth rate $\alpha_j$ multiplied by the variance $\sigma_0^2$ as shown in:

$$\Sigma_{ij} = \sigma_0^2 \text{corr}(\alpha_i, \alpha_j). \qquad \text{Equation 2}$$

In one example of the covariance matrix, the correlation between two known instability growth rates $\alpha_i$ and $\alpha_j$ is based on the distance between the input vectors $x_i$ and $x_j$ as shown in:

$$\text{corr}(\alpha_i, \alpha_j) = r(x_i, x_j), \qquad \text{Equation 3}$$

where r is a correlation function based on the distance between the input vectors $x_i$ and $x_j$.

In this example, the correlation function r is chosen based on the assumption that changes in the growth rate are smooth with respect to changes in the input vector. In other words, the correlation function r is chosen based on the assumption that the growth rates are infinitely differentiable with respect to the input vector. A squared exponential covariance function is an example of one correlation function that is consistent with this assumption. A squared exponential covariance function is:

$$r(x_i, x_j) = \exp\left(-\sum_{k=1}^{n} \left[\frac{x_i^{(k)} - x_j^{(k)}}{\tau_k}\right]^2\right), \qquad \text{Equation 4}$$

where the input vectors include n elements (boundary-layer properties and one or more mode parameters), $\tau_k$ is a length-scale parameter for the $k^{th}$ element of the input vectors, and $x_i^{(k)}$ is the value of the $k^{th}$ element of the input vector that is associated with the known instability growth rate $\alpha_i$. The length-scales may be calculated using an optimization technique such as marginal likelihood (ML-II maximization) using part of the training dataset where there is sufficient data. Other covariance functions may be used that make other assumptions about the relation between the growth rates and the input vectors.

Thus, for cases where the vector of regressor weights must be calculated, equations 1-4 may be used. As long as the training dataset does not change, the vector of regressor weights will not change. Accordingly, after calculating the vector of regressor weights, it may be stored for future use when performing the exemplary process on other points using the same training dataset.

Operations 408 and 410 are performed for each instability mode from the matrix constructed in operation 404. In the discussion of operations 408 and 410 below, the term "current instability mode" refers to one instability mode of the plurality of instability modes from operation 404.

In operation 408, a covariance vector is calculated. The covariance vector comprises the covariance of a predicted instability local growth rate $\alpha_0$ at the POI with respect to each of the known instability growth rates in the training dataset. Thus, access to the training dataset is required for operation 408.

The covariance vector may be calculated in the same manner as explained above with respect to operation 406 except using the input vector $x_0$ for $\alpha_0$ that includes the boundary-layer properties at the POI from operation 404 and at least one mode parameter describing the current instability mode. The covariance vector has m elements.

In operation 410, the predicted instability local growth rate is determined using the vector of regressor weights and the covariance vector $\Sigma_2$. For example, the relationship:

$$\alpha_0 = \Sigma_2 \beta + \mu \qquad \text{Equation 5}$$

may be used to predict the instability local growth rate at the POI, where $\mu$ is the prior mean, which specifies the instability local growth rate far away from the input vectors included in the training dataset. In some cases, the prior mean may be zero.

Optionally, a confidence measure may be determined for each instability local growth rate determined in operation 410 based on the variance of the predicted instability growth rate. The confidence measure may, for example, be useful in determining whether the training dataset is suitable for transition prediction on the current computer-generated aircraft surface. A low confidence measure may indicate that the user should update the training dataset.

The variance of the predicted instability local growth rate may be determined according to $$\text{cov}(\alpha_0) = \Sigma_3 \Sigma_1^{-1} \Sigma_3^T \qquad \text{Equation 6}$$

where $\Sigma_3$ is the covariance vector of the predicted instability local growth rate with respect to the known instability growth rates in the training dataset and $\Sigma_1$ is the covariance matrix discussed in operation 406 above. The vector $\Sigma_3$ may be determined according to the method described above with respect to equations 2-4.

In operation 412, a point on the n-factor envelope is determined based on the instability local growth rates from operation 410 for each instability mode from operation 404. A point on the n-factor envelope represents a composite of all the individual n-factors due to the different instability modes. Generally, the point on the n-factor envelope is the largest n-factor at the point of all the instability modes.

An individual n-factor represents the overall amplification or attenuation of an instability mode at a particular point. The n-factor at a point accounts for the cumulative effect of all amplification or attenuation that occurs prior to that point. In general, instabilities that become amplified beyond a threshold indicate the presence of turbulent flow. In some cases, this threshold is called the critical point.

An example process for determining a point on the n-factor envelope includes calculating an n-factor for each instability mode at the POI using equation 7, below. The n-factor n for a given point x may be expressed as:

$$n(x) = \int_{xi_0}^{x} -\alpha(x')\,dx', \qquad \text{Equation 7}$$

where $-\alpha(x')$ is the predicted instability local growth rate at point x' as calculated in operation 410 and $xi_0$ is the neutral point, which is the streamwise point where the instabilities start to grow. To calculate the n-factor for the POI, it may be necessary to determine instability local growth rates at other points besides the POI. For example, instability local growth rates for streamwise points between the POI and the neutral point may be needed. Operations 404 and 408 discussed above may be used for each streamwise point to determine the required instability local growth rates.

Optionally, a confidence measure may be determined for each of the individual n-factors determined in operation 412. The confidence measure may, for example, be useful in determining whether the training dataset is suitable for transition prediction on the current computer-generated aircraft surface. A low confidence measure may indicate that the user should update the training dataset.

In one case, the confidence measure is determined based on the variance of the n-factor. The variance may be determined by approximating the integral in equation 6 by numerical integration as being a weighted sum of the individual instability growth rates from $x_0$ to x or $$\sum_{i=1}^{n} -\alpha_i c_i,$$

where $-\alpha_i$ is the predicted instability growth rate at $x_i$, $c_i$ is the weight coefficient for $-\alpha_i$, and there are n predicted instability growth rates between $x_0$ and x. The variance of the n-factor may then be determined according to $$\text{cov}(n(x)) = c^T \Sigma_4 \Sigma_1^{-1} \Sigma_4^T c, \qquad \text{Equation 8}$$

where c is a weight coefficients vector for the numerical integral above, $\Sigma_4$ is the covariance matrix of the n growth rates in the numerical integral above with respect to the known instability growth rates in the training dataset, and $\Sigma_1$ is the covariance matrix discussed in operation 406 above. The matrix $\Sigma_4$ may be determined according to the method described above with respect to equations 2-4.

After determining n-factors at the POI for each instability mode from operation 406, the point on the n-factor envelope can be determined. The point on the n-factor envelope may be determined by calculating a pointwise maximum of the individual mode n-factors. However, using the pointwise maximum for the point on the n-factor envelope may lead to a non-smooth or irregular n-factor envelope (when viewed as a curve across the computer-generated aircraft surface). Sometimes a smooth envelope may be preferred, which may be provided by the following alternative example. A weighted average σ of individual mode n-factors may be calculated as shown in equation 3, below:

$$\sigma(n_1, \ldots, n_k) = \frac{\sum_{i}^{k} n_i \exp(n_i)}{\sum_{i}^{k} \exp(n_i)}, \qquad \text{Equation 9}$$

where $n_k$ is the n-factor for the individual mode k. As the n-factor for an individual mode becomes larger compared to the rest of the n-factors, σ will approach the true maximum.

However, because σ is a weighted average, σ will always be a little less than the true maximum. The formula may be modified using the equivalent of a safety factor. A safety factor may be appropriate especially when all of the n-factors are small and are about the same value. Equation 10, below, provides one example for calculating a point on the n-factor envelope by applying a suitable safety factor to a weighted average σ of the n-factors for the individual modes:

$$n = \sigma \left[ 1 + 0.25\left(1 - \frac{\sigma}{10}\right)^2 \right]. \qquad \text{Equation 10}$$

After determining the point on the n-factor envelope with respect to the POI, the point can be compared to a threshold value or critical point to determine whether the POI is adjacent to laminar or turbulent flow. For example, a threshold value or critical point for transition prediction may be based on empirical data for sufficiently similar boundary layers. If the point on the n-factor envelope (at the POI) is less than the threshold value or critical point, then the flow near the POI is considered laminar. If the point on the n-factor envelope (at the POI) is greater than this threshold value or critical point, then the flow at the flow near the POI is considered turbulent.

The threshold value of the n-factor for the onset of turbulence may be determined empirically for a given set of conditions. For example, for aircraft surfaces in wind tunnels, the n-factor critical point for TS waves may occur at a value ranging from 5 to 9. For aircraft surfaces in atmospheric flight, the n-factor critical point for TS waves may occur at a value ranging from 8 to 14.

The operations of the exemplary process above have been described with respect to a single POI on the computer-generated aircraft surface used to determine a point on an n-factor envelope. To determine other points on the n-factor envelope and construct an n-factor envelope curve, portions of the above process can be repeated using other points of interest (POIs) on the computer-generated aircraft surface. For example, the operations 402, 408, 410, and 412 may be repeated for as many points as necessary to obtain a satisfactory resolution for the n-factor envelope across the computer-generated aircraft surface. Exemplary n-factor envelope curves are shown as profiles in FIGS. 12 and 13 and as a shaded plot in FIG. 2.

Figure 7:
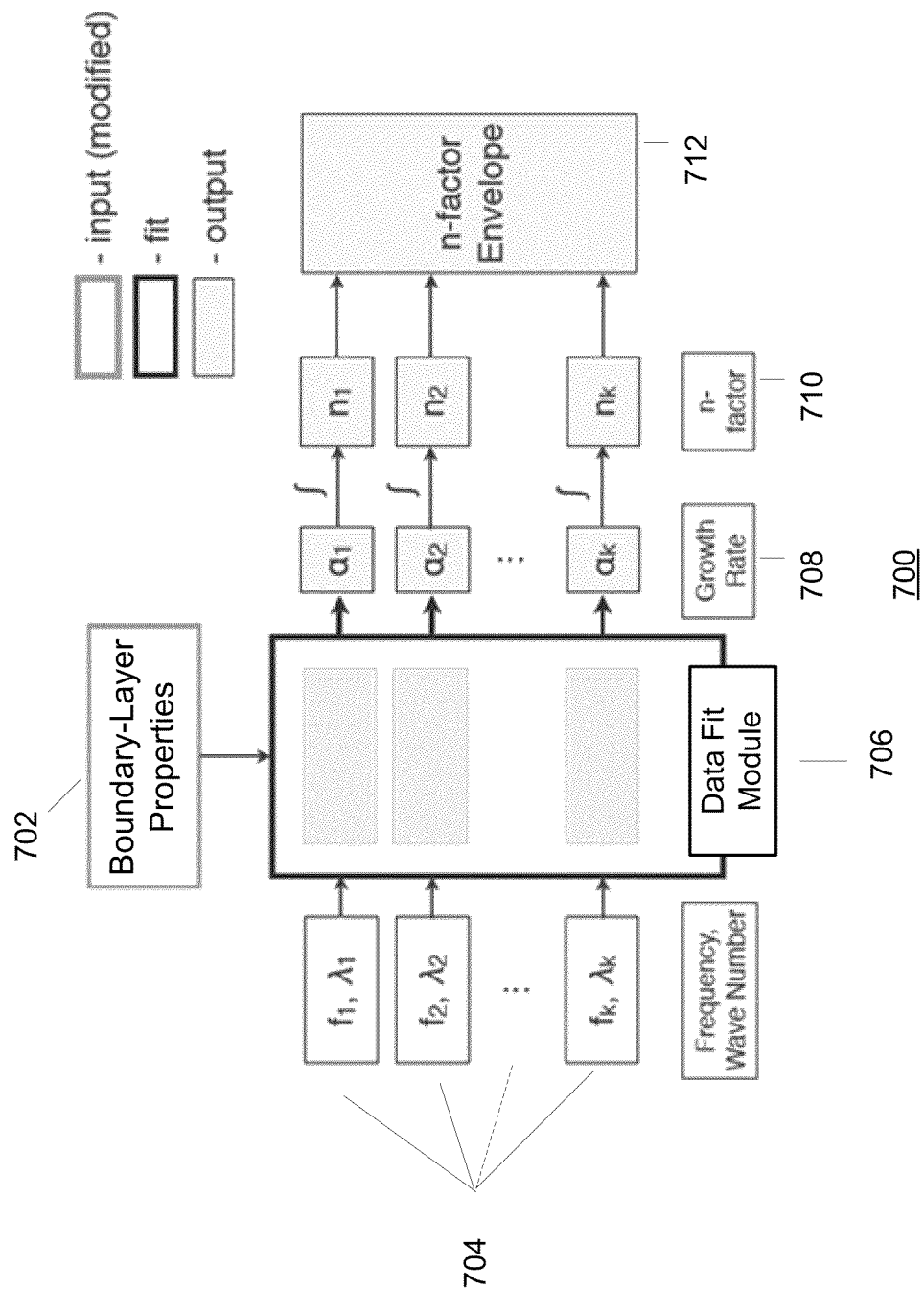
FIG. 7 depicts a data flow for transition prediction according to an exemplary process.

FIG. 7 depicts a data-flow chart 700 for the exemplary process 400 described above with respect to FIG. 4. The boundary-layer properties 702 obtained from operation 402 and the instability modes 704 obtained from operation 404 are used as inputs to the data fit module 706 that represents operations 406, 408, and 410 above. The data fit module 706 outputs the growth rates 708 discussed above in operation 410 for each instability mode 704 defined by instability mode parameters temporal frequency f and spanwise wave number $\lambda$. As described in operation 412, based on the instability local growth rates 708 for the instability modes 704, an n-factor 710 is calculated for each of the instability modes 704. The individual n-factors are then used to create an n-factor envelope 712. The fluid flow can be considered as transitioning from laminar to turbulent fluid flow at the points or locations closest to the leading edge on the aircraft surface where the n-factor envelope 712 first exceeds a threshold value or critical point.

2. Training Dataset Generation

Figure 8:
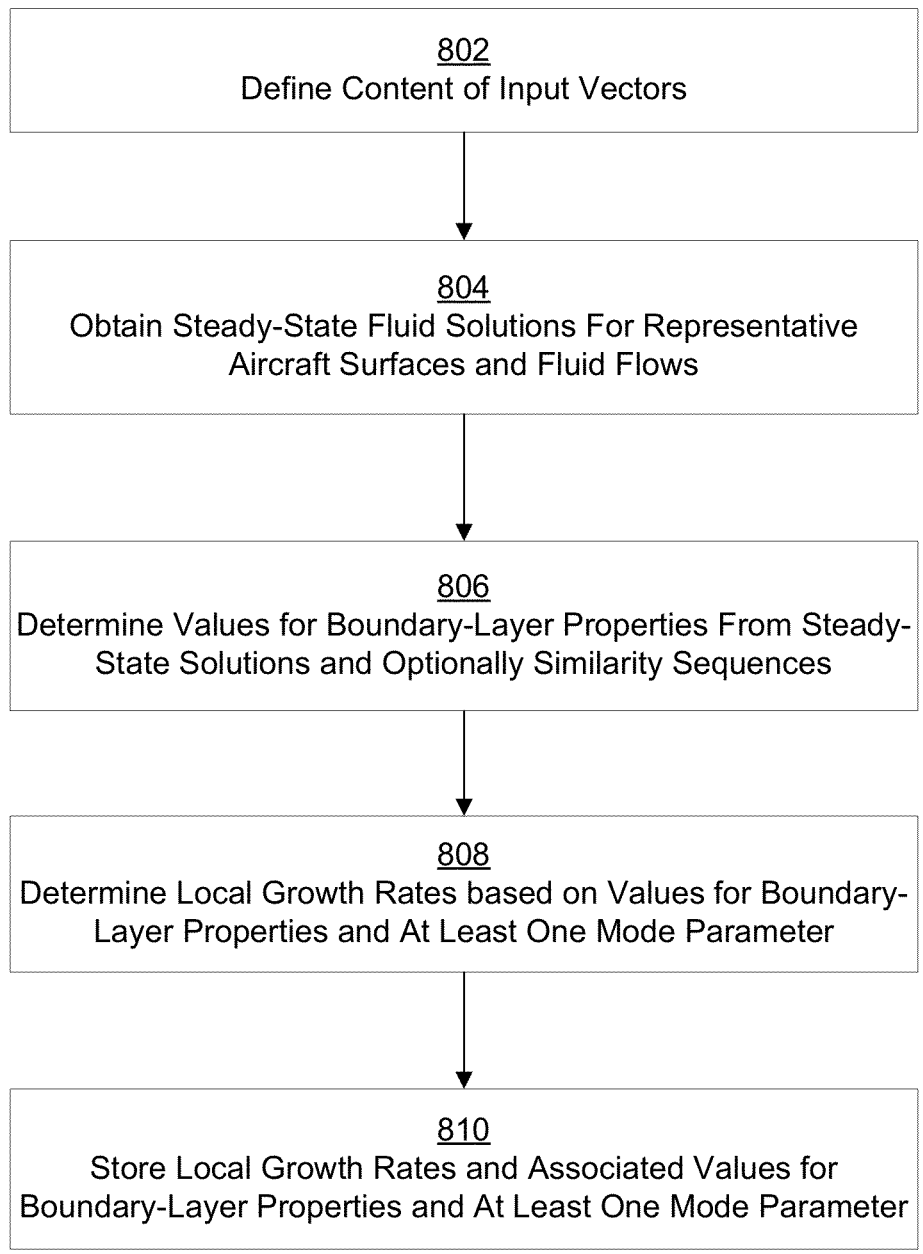
FIG. 8 depicts an exemplary process for generating a training dataset.

The flow chart of FIG. 8 depicts an exemplary process 800 for generating a training dataset. As described above, operation 406 (FIG. 4) may need access to the training dataset and operation 408 (FIG. 4) does need access to the training dataset. As briefly discussed above, the training dataset contains known instability growth rates and an associated input vector for each known instability growth rate. The input vector associated with each known instability growth rate represents the inputs to the analysis used to produce the known instability local growth rate.

In operation 802 of the process 800 for generating the training dataset, the content of the input vectors is defined. The training input vectors include boundary-layer properties and one or more mode parameters. As discussed above in conjunction with operation 402 (FIG. 4), the boundary-layer properties used in the input vectors may vary depending on the type of instability being considered. The same boundary-layer properties discussed with respect to FIGS. 6 and 7 above, for TS-waves and stationary crossflow vortices, respectively, may be selected for inclusion in the training input vectors.

Like the boundary-layer properties, the relevant mode parameters may depend on the type of instability being considered. A similar process for choosing the one or more mode parameters as discussed above with respect to operation 404 (FIG. 4) may be used to define the one or more mode parameters included in the training input vectors. For example, both spanwise wave number and temporal frequency may be important when considering TS-wave instabilities. Alternatively, when considering stationary crossflow vortices, the temporal frequency may always be zero and only the spanwise wave number is needed. Therefore, when considering TS-wave instabilites, the training input vectors may include both a spanwise wavenumber and a temporal frequency for the mode, but when considering stationary crossflow vortices, the training input vectors may include the spanwise wavenumber without the temporal frequency.

Boundary-layer properties and mode parameters used in the training input vectors may also be selected depending on the desired quality of the dataset. In general, a large training input vector may provide a training dataset that enables a more robust prediction when used in the exemplary process. However, larger training input vectors may also produce a training dataset that is more computationally intensive to use in the exemplary process.

In operation 804, a representative set of computer-generated aircraft surfaces and fluid flows are obtained. For example, aircraft surfaces with varying characteristics (e.g., wings having different airfoil profiles or sweep angles) may be selected or defined by the user. For each combination of a selected computer-generated aircraft surface and a selected fluid flow, a CFD module or some other suitable means calculates a steady-state solution.

In operation 806, boundary-layer properties and a corresponding boundary-layer solution are determined using each steady-state solution determined in operation 804. For each steady-state solution, values for the same set of boundary-layer properties are determined. The boundary-layer properties may include, for example, temperature, a local velocity vector, Mach number, Reynolds number, or pressure gradient.

Optionally in operation 806, boundary-layer properties and solutions may also be determined based on similarity sequences. This may be suitable if LST-based analysis is being used to produce growth rates but may not be suitable if other analysis techniques are being used. A similarity sequence allows for generation of boundary-layer properties and solutions by modifying the shape of the boundary layer extracted from an existing steady-state solution. For example, the boundary-layer solution determined from a steady-state solution from operation 804 may be modified to generate a new boundary-layer solution and corresponding set of boundary-layer properties by warping the boundary-layer profiles in some advantageous manner. This is done without having to perform additional CFD simulations or empirical analysis and may be particularly helpful when certain values of the boundary-layer properties are desired for the training dataset, but it is difficult to find aircraft surfaces for which operation 804 will produce those desired values. For example, a similarity sequence can be generated by warping the boundary layer at a single streamwise station. This may be done by, for example, scaling the warped boundary-layer profile (e.g., the local velocity profiles 502 and 506 of FIG. 5 and the temperature profile) by the square root of the distance from the leading edge to fill all streamwise stations with similar boundary-layer profiles. In this example, the boundary-layer properties extracted from the new similarity sequence will still cover the same parameters (e.g., temperature value, local velocity vector values) but the values for those parameters will be adjusted.

In operation 808, instability local growth rates are determined. These growth rates become the known instability local growth rates. In an example of operation 808, LST-based analysis is performed using the multiple sets of boundary-layer properties as determined in operation 806. LST-based analysis is described in more detail below with respect to FIG. 15. For each boundary-layer solution from operation 806, LST-based analysis is performed for one or more instability modes. As discussed above, this operation may require that the user interact with LST-based analysis to check for lost modes and nonphysical results. However, once the dataset is created, LST-based analysis is not needed to perform the exemplary process as discussed above with respect to FIG. 4.

In operation 810, the local growth rates produced in operation 806 are stored in the dataset. In addition, each local growth rate is also associated with an input vector having contents as defined in operation 802 and includes at least one mode parameter and the boundary-layer properties that were determined from the same inputs to the analysis in operation 808 that produced the instability local growth rate.

Every possible combination of modes and boundary-layer properties cannot be expressly included in the dataset. The exemplary process as discussed above with respect to FIG. 4 enables interpolation of the results in the training dataset, allowing for accurate estimates of growth rates under conditions not specifically in the training dataset.

Figure 9:
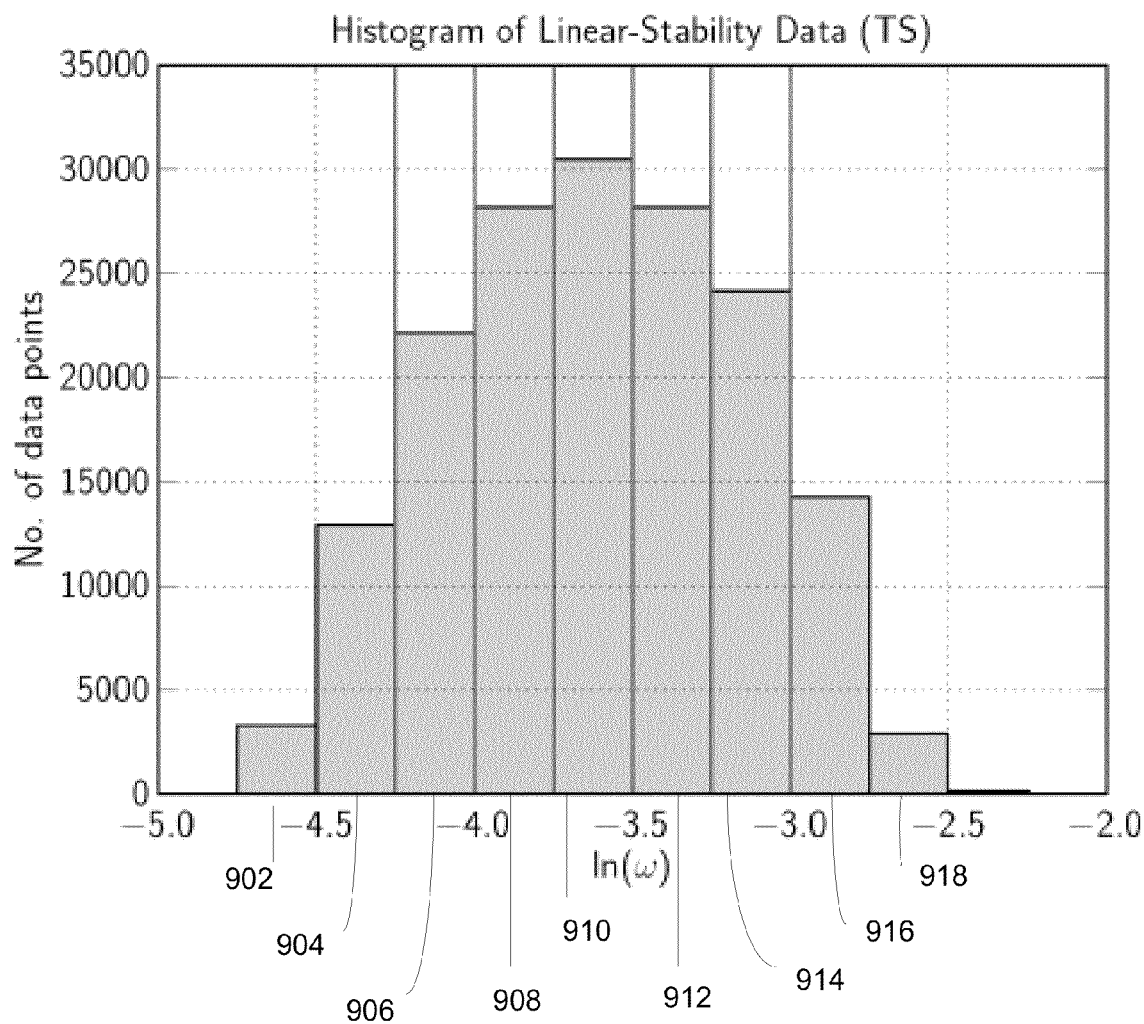
FIG. 9 depicts a partition of a dataset of known growth-rate results based on temporal frequency of the mode associated with the known instability growth rate.

In one example, the training dataset is partitioned and only the partitions of the training dataset are used in the exemplary process described above with respect to FIG. 4. This may be useful, for example, if the dataset is too large to feasibly create a covariance matrix of the entire dataset. In this case, the dataset may be partitioned and a covariance matrix and a vector of regressor weights may be constructed for each partition in accordance with the exemplary process. For example, with reference to FIG. 9, the training dataset may be partitioned based on the temporal frequency of the mode associated with the growth rate. A covariance matrix and a vector of regressor weights may then be calculated for each partition 902, 904, 906, 908, 910, 912, 914, 916, and 918.

In another example, all of the data in the training dataset or all of the data in a particular partition is not needed. In this example, only a training subset of the training dataset or the partition is used. Individual datapoints (i.e., known instability growth rates and associated training input vectors) are added to the training subset until the exemplary process described above with respect to FIG. 4 can predict some threshold number of the known instability growth rates that are not in the training subset to a threshold error tolerance. Optionally, in adding data to the training subset, priority can be given to those datapoints with known instability growth rates that the exemplary process predicts with the highest error using the current training subset. Addition of datapoints to the training subset may continue until the training subset meets some error tolerance. For example, individual datapoints may be added to the training subset until the exemplary process predicts 90% of the known instability growth rates not in the training subset with error not exceeding 10% of the known instability growth rate.

Operations 802, 804, 806, 808, and 810 may be performed by an end user, a third-party vendor, or other suitable party. Additionally, different operations may be performed by different parties. For example, if an end user does not have experience with LST-based analysis, the end user may have a third-party vendor perform operation 808 only. In another example, an end user may have a third-party vendor perform all operations and supply only the training dataset, the training partitions, or the training subsets. In yet another example, a third-party vendor may generate the training dataset but the end user will partition the dataset or determine what subset of the dataset to use. In still yet another example, a user may obtain a training dataset from a third-party vendor and then add additional data to the training dataset to customize it for the user's needs. This may be useful, for example, if a confidence measure of the predicted local instability growth rates or the n-factors according the exemplary process indicates an unacceptable level of error.

3. LST-Based Analysis

Figure 15:
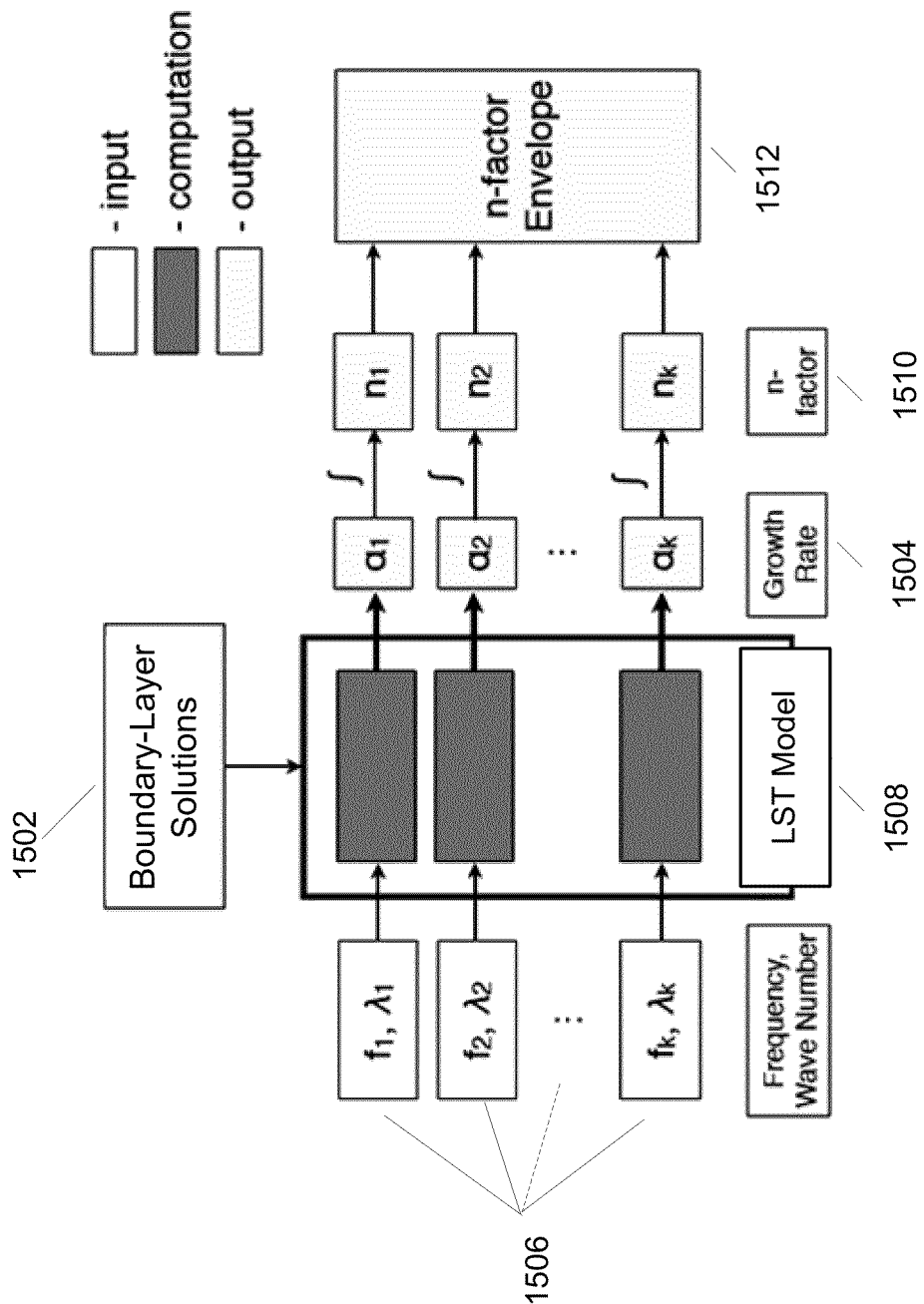
FIG. 15 depicts a data flow for transition prediction using linear stability theory.

FIG. 15 depicts a data flow for an LST-based analysis used to predict a transition point. As discussed above, LST-based analysis may be used in generating the training dataset. FIG. 15 depicts how LST-based analysis uses boundary-layer solutions 1502, provided by, for example, a CFD simulation module, to determine local growth rates 1504 of individual instability modes 1506 in the boundary-layer region of the fluid flow. LST-based analysis 1508 uses selected mode parameters 1506 (e.g., wave number $\lambda_k$ and frequency $f_k$) and boundary-layer solutions (e.g., local velocity, and temperature profiles) to compute a streamwise dimensionless wavelength and a local streamwise amplification factor. These two quantities are used in a complex-valued eigenvalue analysis that determines the instability local growth rates 1504 as modeled by a linear-dynamical system. The type of instability (e.g., TS wave or crossflow vortex) associated with the instability local growth rate is determined based on the eigenvector solution corresponding to the eigenvalue, which is also an output of the LST-based analysis. Thus, regardless of the type of instability, the LST-based analysis is the same. The type of instability is determined based on the physical behavior of the wave.

LST-based analysis results are generally considered to be accurate under many conditions. An example of an LST-based analysis tool is the LASTRAC software tool developed by NASA.

Using the growth rates 1504, an n-factor 1510 can be determined for each of the selected modes 1506. Referring to FIG. 15, based on LST-based analysis results, n-factors 1510 for each instability mode 1506 are calculated. An n-factor represents the natural logarithm of the ratio of amplification of an individual instability mode at a given point to its initial amplification at its neutral point. The n-factor represents the amplification or attenuation of an instability mode at a given point on the aircraft surface. As discussed above, if the n-factor reaches a threshold or critical point, the flow may be considered turbulent.

An n-factor envelope 1512 is determined using the n-factors from each selected instability mode 1506. N-factor envelope 1512 represents a composite of the n-factors for all of the selected instability modes 1506. In some cases, the n-factor envelope 1512 represents the largest n-factor at a given point for a set of selected instability modes 1506. For example, the n-factor envelope 1512 may be calculated by taking the point-wise maximum of the n-factors of the individual instability modes in the envelope.

4. Results of Computer Experiments

Figure 10:
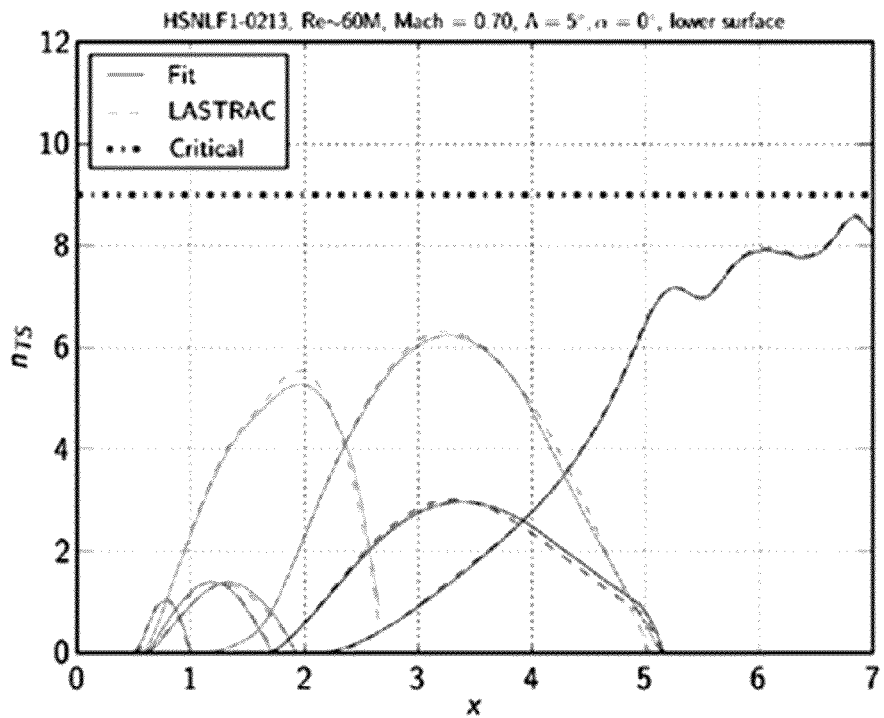
FIG. 10 depicts results of an exemplary process for modeling the n-factors for individual modes of TS-wave instabilities.
Figure 11:
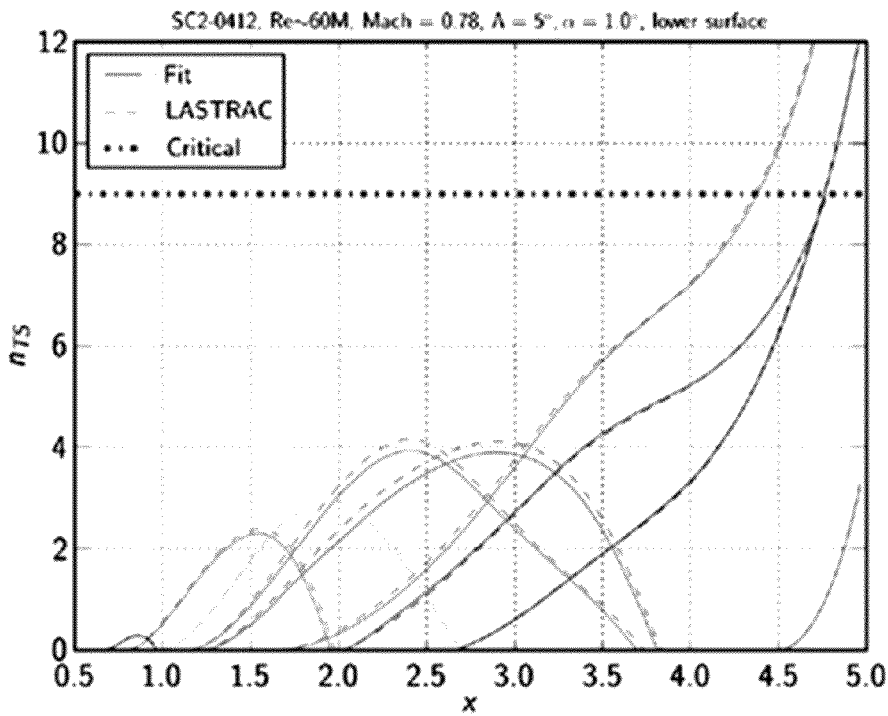
FIG. 11 depicts results of an exemplary process for modeling the n-factors for individual modes of TS-wave instabilities.
Figure 12:
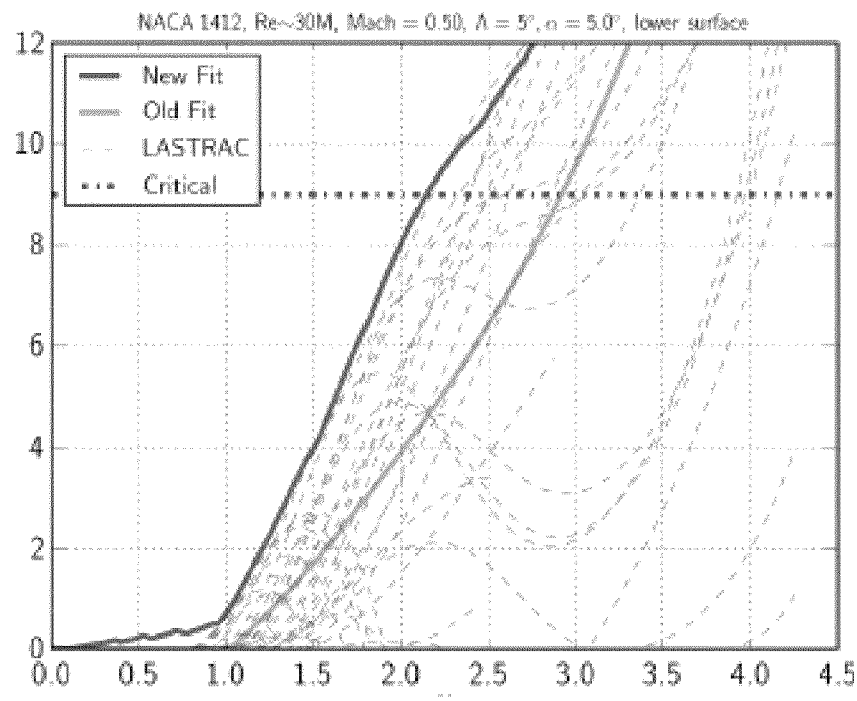
FIG. 12 depicts results of an exemplary process for modeling the n-factor envelope for TS-wave instabilities.
Figure 13:
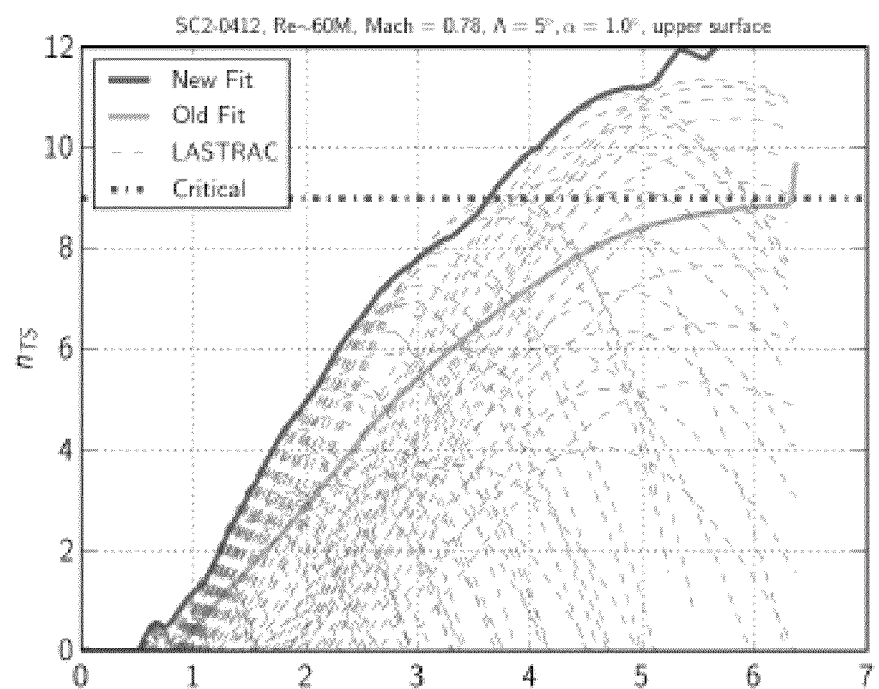
FIG. 13 depicts results of an exemplary process for modeling the n-factor envelope for TS-wave instabilities.
Figure 14:
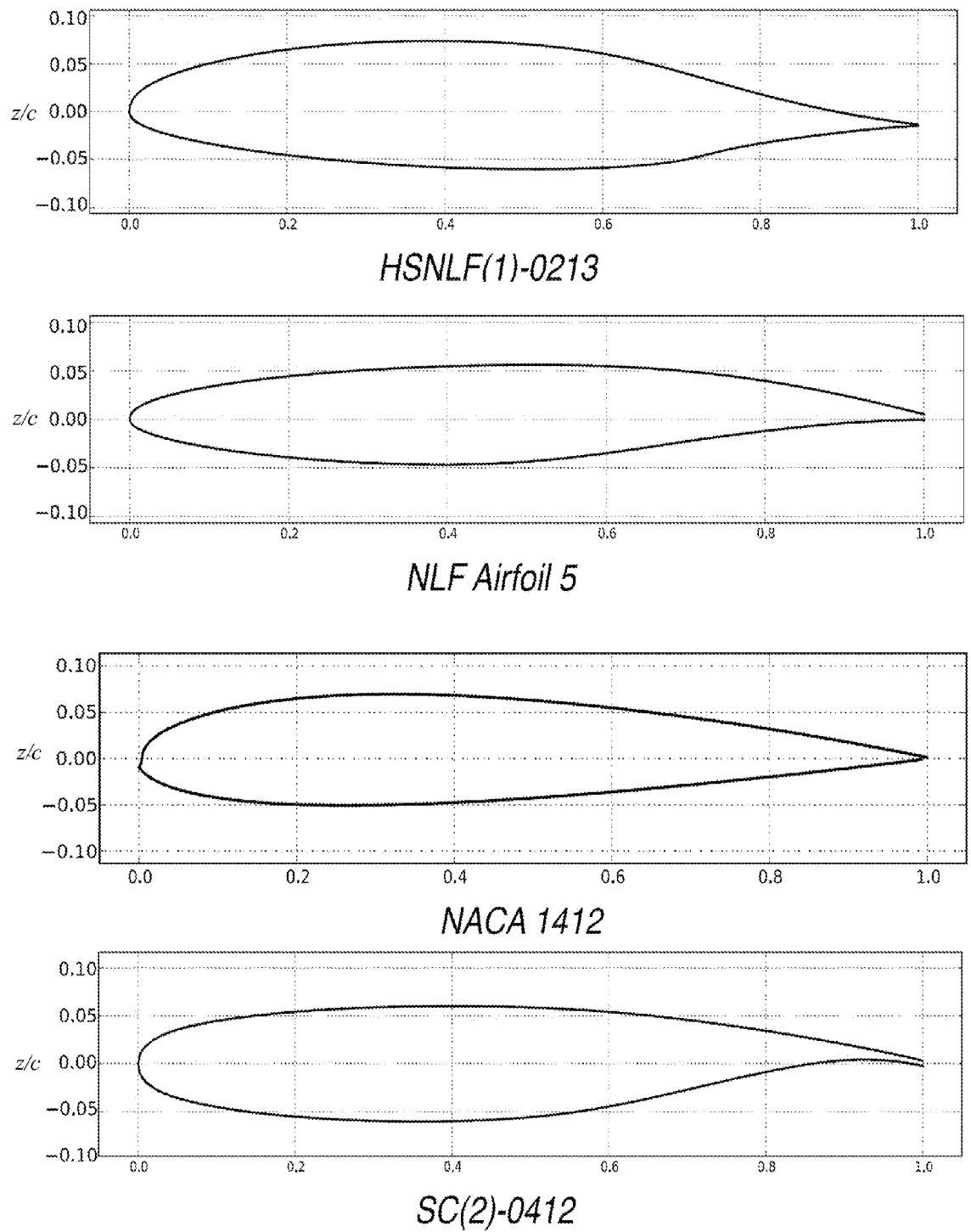
FIG. 14 depicts a set of representative airfoils for generating a training dataset of known instability local growth rates for individual modes.

An exemplary transition prediction process based on the exemplary process described above was tested using wing surfaces having airfoil cross sections as shown in FIG. 14. TS-wave instability n-factor results for individual modes are shown in FIGS. 10 and 11. TS-wave results for the n-factor envelopes are shown in FIGS. 12 and 13. For the purposes of these results, the threshold value or critical point is assumed to be 9.

Computer-generated aircraft surfaces based on airfoil cross sections shown in FIG. 14 were obtained. The following boundary-layer conditions were then selected for each aircraft surface:

Untapered wings with aspect ratio of 10;
Leading-edge sweep: 0°, 5°, 15°, 35°;
Chord Reynolds numbers: 6, 30, 60 million; and
Angle of attack: 0°, 5°.

For each steady-state flow solution, LST-based analysis was used to determine instability local growth rates for individual modes. Additionally, LST-based analysis was used with similarity sequences as well to produce additional instability local growth rates. Because TS-wave instabilities were being considered, the growth rates were then stored in a dataset with the wave number, the mode frequency, the Reynolds number, the local Mach number, five points along the streamwise velocity profile, five points along the crossflow velocity profile, five points along the temperature profile, and the angle between the reference axis and the external streamline. Initially, a dataset of about 300,000 known instability growth rates with associated input vectors was generated.

The dataset was partitioned based on mode frequency. The exemplary process described above with respect to FIG. 4 was performed using a subset of the partitions.

FIGS. 10 and 11 are graphs showing a comparison among n-factors for individual instability modes calculated with the exemplary process described above with respect to FIG. 4 and LST-based analysis. FIGS. 12 and 13 are graphs of n-factor envelope results according to an envelope modeling technique, n-factor envelope results according to the exemplary transition prediction process, and individual instability mode n-factor results as calculated by LST-based analysis. As can be seen, the n-factor envelope calculated based on the exemplary transition prediction technique better predicts the results of the LST-based analysis as compared to the envelope modeling technique.

5. Computer and Computer Network System

Figure 16:
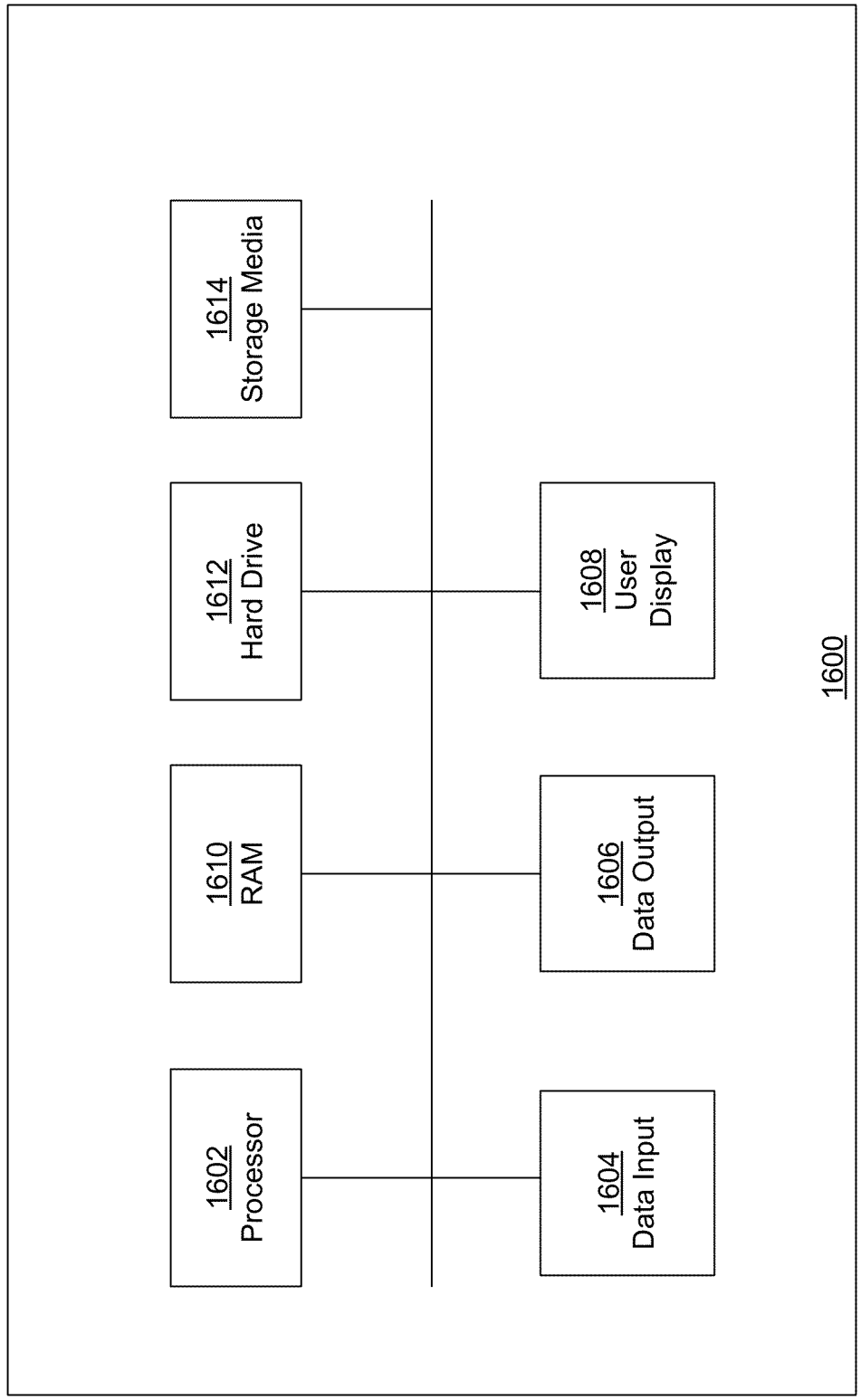
FIG. 16 depicts an exemplary computer system for simulating fluid flow over computer-generated aircraft surface.

The techniques described herein are typically implemented as computer software (computer-executable instructions) executed on a processor of a computer system. FIG. 16 depicts an exemplary computer system 1600 configured to perform any one of the above-described processes. Computer system 1600 may include the following hardware components: processor 1602, data input devices (e.g., keyboard, mouse, keypad) 1604, data output devices (e.g., network connection, data cable) 1606, and user display (e.g., display monitor) 1608. The computer system also includes nontransitory memory components including random access memory (RAM) 1610, hard drive storage 1612, and other computer-readable storage media 1614.

Processor 1602 is a computer processor capable of receiving and executing computer-executable instructions for performing any of the processes described above. Computer system 1600 may include more than one processor for performing the processes. The computer-executable instructions may be stored on one or more types of nontransitory storage media including RAM 1610, hard drive storage 1612, or other computer-readable storage media 1614. Other computer-readable storage media 1614 include, for example, CD-ROM, DVD, magnetic tape storage, magnetic disk storage, solid-state storage, and the like.

Figure 17:
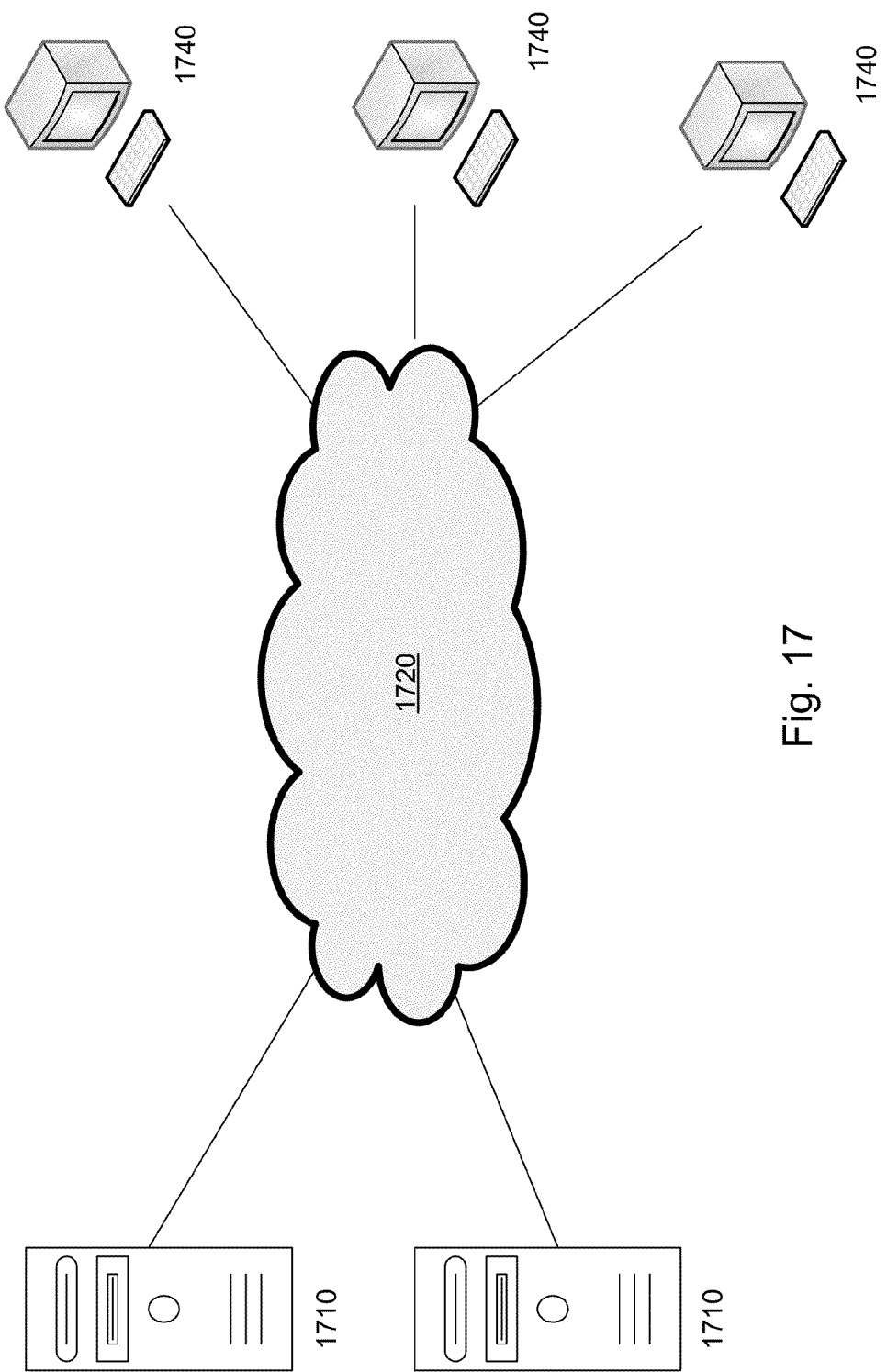
FIG. 17 depicts an exemplary computer network.

FIG. 17 depicts an exemplary computer network for distributing the processes described above to multiple computers at remote locations. One or more servers 1710 may be used to perform portions of the process described above. For example, one or more servers 1710 may store and execute computer-executable instructions for receiving information for generating a computer-generated simulation. The one or more servers 1710 are specially adapted computer systems that are able to receive input from multiple users in accordance with a web-based interface. The one or more servers 1710 are able to communicate directly with one another using a computer network 1720, including a local area network (LAN) or a wide area network (WAN), such as the Internet.

One or more client computer systems 1740 provide an interface to one or more system users. The client computer systems 1740 are capable of communicating with the one or more servers 1710 over the computer network 1720. In some embodiments, the client computer systems 1740 are capable of running a Web browser that interfaces with a Web-enabled system running on one or more server machines 1710. The Web browser is used for accepting input data from the user and presenting a display to the user in accordance with the exemplary user interface described above. The client computer 1740 includes a computer monitor or other display device for presenting information to the user. Typically, the client computer 1740 is a computer system in accordance with the computer system 1600 depicted in FIG. 16.

Although the invention has been described in considerable detail with reference to certain embodiments thereof, other embodiments are possible, as will be understood by those skilled in the art.

We claim:

1. A computer-implemented method for predicting whether a point on a computer generated surface is adjacent to laminar or turbulent fluid flow, the method comprising:
obtaining, using a computer, a plurality of boundary-layer properties at the point on the computer-generated surface using a steady-state solution of a fluid flow in a region adjacent to the point;
obtaining, using the computer, a plurality of instability modes, wherein one or more mode parameters define each instability mode;
obtaining, using the computer, a vector of regressor weights of known instability growth rates in a training dataset;
for each instability mode in the plurality of instability modes:
determining, using the computer, a covariance vector comprising a covariance of a predicted local instability growth rate for the point with respect to each of the known instability growth rates in the training dataset; and
determining, using the computer, the predicted local instability growth rate at the point for the instability mode using the vector of regressor weights and the covariance vector; and
determining, using the computer, an n-factor envelope at the point for the plurality of instability modes using the predicted local instability growth rates, wherein the n-factor envelope is indicative of whether the point is adjacent to laminar or turbulent flow.

2. The method of claim 1, further comprising:
determining whether the fluid flow at the point is turbulent or laminar based on whether the n-factor envelope at the point exceeds a threshold value, wherein if the n-factor envelope at the point exceeds the threshold value, then the point is adjacent to turbulent flow and wherein if the n-factor envelope at the point is less than the threshold value, then the point is adjacent to laminar flow.

3. The method of claim 1,
wherein the training dataset includes a training input vector associated with each known instability growth rate,
wherein each training input vector includes training boundary-layer properties and at least one training instability mode parameter,
wherein the vector of regressor weights is based on a covariance matrix, wherein the covariance matrix has elements that are covariances of one known instability mode with respect to another known instability mode, wherein a covariance of a first known instability mode with respect to a second known instability mode is based on a distance between a first and a second training input vectors associated with a first and a second known instability growth rates, respectively, wherein the predicted local instability growth rate is associated with the plurality of boundary-layer properties and at least one training instability mode parameter describing an instability mode, wherein the covariance for the predicted local instability growth rate with respect to a known instability growth rate is based on a distance from the plurality of boundary-layer properties and the at least one training instability mode parameter to the training input vector associated with the known instability growth rate.

4. The method of claim 3, further comprising:
determining whether the fluid flow at the point is turbulent or laminar based on whether the n-factor envelope at the point exceeds a threshold value, wherein if the n-factor envelope at the point exceeds the threshold value, then the point is adjacent to turbulent flow and wherein if the n-factor envelope at the point is less than the threshold value, then the point is adjacent to laminar flow.

5. The method of claim 3, wherein the training dataset is a subset of one partition of a plurality of partitions of a larger dataset, wherein the known instability growth rates are added to the subset from the partition based on a prediction error associated with predicting the local instability growth rate, and wherein the one partition is chosen based on the boundary-layer properties or the at least one training instability mode parameter.

6. The method of claim 3, wherein the covariance matrix is based on a squared exponential covariance function.

7. The method of claim 3, wherein the covariance matrix and the covariance vector are based on a squared exponential covariance function.

8. The method of claim 1, wherein the plurality of instability modes is of a stationary crossflow type, and wherein each of the plurality of instability modes has a temporal frequency of zero.

9. The method of claim 8, wherein the plurality of boundary-layer properties include crossflow Reynolds number, crossflow velocity ratio, crossflow shape factor, and wall to external temperature ratio, and wherein one mode parameter defining the plurality of instability modes is a spanwise wavelength of the mode.

10. The method of claim 1, wherein the training dataset is generated with linear stability theory (LST) model analysis.

11. The method of claim 1, wherein the training dataset is constructed by:
obtaining a larger dataset of known instability growth rates;
adding a subset of known instability growth rates that are in the larger dataset to the training dataset;
determining a prediction error between a known instability growth rate in the larger dataset that is not in the training dataset and the predicted local instability growth rate; and
based on the prediction error, adding the known instability growth rate to the training dataset from the larger dataset.

12. The method of claim 1, wherein the training dataset is one partition of a plurality of partitions of a larger dataset.

13. The method of claim 1, wherein the training dataset is a subset of one partition of a plurality of partitions of a larger dataset and wherein the known instability growth rates are added to the subset from the partition based on a prediction error associated with predicting the local instability growth rate.

14. The method of claim 1 further comprising:
determining a confidence measure for the predicted local instability growth rate, wherein the confidence measure is based on the covariance of the predicted local instability growth rate with respect to the known instability growth rates in the training dataset.

15. The method of claim 14 further comprising:
if the confidence measure indicates error above a threshold, adding additional known instability growth rates to the training dataset.

16. The method of claim 1, wherein the computer-generated surface is a computer-generated aircraft surface.

17. A nontransitory computer-readable medium storing computer-readable instructions which when executed on a computer perform a method for predicting whether a point on a computer-generated surface is adjacent to laminar or turbulent fluid flow, the medium including instructions for:
obtaining a plurality of boundary-layer properties at the point on the computer-generated surface using a steady-state solution of a fluid flow in a region adjacent to the point;
obtaining a plurality of instability modes, wherein one or more mode parameters define each instability mode;
obtaining a vector of regressor weights of known instability growth rates in a training dataset;
for each instability mode in the plurality of instability modes:
determining a covariance vector comprising a covariance of a predicted local instability growth rate for the point with respect to each of the known instability growth rates in the training dataset; and
determining the predicted local instability growth rate at the point for the instability mode using the vector of regressor weights and the covariance vector; and
determining an n-factor envelope at the point for the plurality of instability modes using the predicted local instability growth rates, wherein the n-factor envelope is indicative of whether the point is adjacent to laminar or turbulent flow.

18. The computer-readable medium of claim 17, further comprising instructions for: determining whether the fluid flow at the point is turbulent or laminar based on whether the n-factor envelope at the point exceeds a threshold value, wherein if the n-factor envelope at the point exceeds the threshold value, then the point is adjacent to turbulent flow and wherein if the n-factor envelope at the point is less than the threshold value, then the point is adjacent to laminar flow.

19. The computer-readable medium of claim 17,
wherein the training dataset includes a training input vector associated with each known instability growth rate,
wherein each training input vector includes training boundary-layer properties and at least one training instability mode parameter,
wherein the vector of regressor weights is based on a covariance matrix, wherein the covariance matrix has elements that are covariances of one known instability mode with respect to another known instability mode,
wherein a covariance of a first known instability mode with respect to a second known instability mode is based on a distance between a first and a second training input vectors associated with a first and a second known instability growth rates, respectively,
wherein the predicted local instability growth rate is associated with the plurality of boundary-layer properties and at least one training instability mode parameter describing an instability mode, wherein the covariance for the predicted local instability growth rate with respect to a known instability growth rate is based on a distance from the plurality of boundary-layer properties and the at least one training instability mode parameter to the training input vector associated with the known instability growth rate.

20. The computer-readable medium of claim 19, further comprising instructions for: determining whether the fluid flow at the point is turbulent or laminar based on whether the n-factor envelope at the point exceeds a threshold value, wherein if the n-factor envelope at the point exceeds the threshold value, then the point is adjacent to turbulent flow and wherein if the n-factor envelope at the point is less than the threshold value, then the point is adjacent to laminar flow.

21. The computer-readable medium of claim 19, wherein the training dataset is a subset of one partition of a plurality of partitions of a larger dataset, wherein the known instability growth rates are added to the subset from the partition based on a prediction error associated with predicting the local instability growth rate, and wherein the one partition is chosen based on the boundary-layer properties or the at least one training instability mode parameter.

22. The computer-readable medium of claim 19, wherein the covariance matrix is based on a squared exponential covariance function.

23. The computer-readable medium of claim 19, wherein the covariance matrix and the covariance vector are based on a squared exponential covariance function.

24. The computer-readable medium of claim 17, wherein the plurality of instability modes is of a stationary crossflow type, and wherein each of the plurality of instability modes has a temporal frequency of zero.

25. The computer-readable medium of claim 24, wherein the plurality of boundary-layer properties include crossflow Reynolds number, crossflow velocity ratio, crossflow shape factor, and wall to external temperature ratio, and wherein one mode parameter defining the plurality of instability modes is a spanwise wavelength of the mode.

26. The computer-readable medium of claim 17, wherein the training dataset is generated with linear stability theory (LST) model analysis.

27. The computer-readable medium of claim 17, wherein the training dataset is constructed by:
  obtaining a larger dataset of known instability growth rates;
  adding a subset of known instability growth rates that are in the larger dataset to the training dataset;
  determining a prediction error between a known instability growth rate in the larger dataset that is not in the training dataset and the predicted local instability growth rate; and
  based on the prediction error, adding the known instability growth rate to the training dataset from the larger dataset.

28. The computer-readable medium of claim 17, wherein the dataset is one partition of a plurality of partitions of a larger dataset.

29. The computer-readable medium of claim 17, wherein the training dataset is a subset of one partition of a plurality of partitions of a larger dataset and wherein the known instability growth rates are added to the subset from the partition based on a prediction error associated with predicting the local instability growth rate.

30. The computer-readable medium of claim 17 further comprising instructions for:
  determining a confidence measure for the predicted local instability growth rate, wherein the confidence measure is based on the covariance of the predicted local instability growth rate with respect to the known instability growth rates in the training dataset.

31. The computer-readable medium of claim 30 further comprising instructions for:
  if the confidence measure indicates error above a threshold, adding additionally known instability growth rates to the training dataset.

32. The method of claim 17, wherein the computer-generated surface is a computer-generated aircraft surface.

* * * * *